(12) United States Patent
Sullivan et al.

(10) Patent No.: US 12,544,437 B2
(45) Date of Patent: Feb. 10, 2026

(54) METHODS FOR IMPROVED THERAPEUTIC USE OF RECOMBINANT AAV

(71) Applicant: Ultragenyx Pharmaceutical Inc., Novato, CA (US)

(72) Inventors: Barbara Anne Sullivan, Tiburon, CA (US); Kathleen Phillips Mckeever, San Anselmo, CA (US)

(73) Assignee: Ultragenyx Pharmaceutical Inc., Novato, CA (US)

( * ) Notice: Subject to any disclaimer, the term of this patent is extended or adjusted under 35 U.S.C. 154(b) by 983 days.

(21) Appl. No.: 17/764,295

(22) PCT Filed: Oct. 1, 2020

(86) PCT No.: PCT/US2020/053805
§ 371 (c)(1),
(2) Date: Mar. 28, 2022

(87) PCT Pub. No.: WO2021/067598
PCT Pub. Date: Apr. 8, 2021

(65) Prior Publication Data
US 2022/0347298 A1     Nov. 3, 2022

Related U.S. Application Data

(60) Provisional application No. 62/910,790, filed on Oct. 4, 2019.

(51) Int. Cl.
| | | |
|---|---|---|
| *A61K 39/395* | (2006.01) |
| *A61K 31/5377* | (2006.01) |
| *A61K 31/573* | (2006.01) |
| *A61K 31/675* | (2006.01) |
| *A61K 31/69* | (2006.01) |
| *A61K 38/18* | (2006.01) |
| *A61K 38/36* | (2006.01) |
| *A61K 38/37* | (2006.01) |
| *A61K 38/44* | (2006.01) |
| *A61K 38/45* | (2006.01) |
| *A61K 38/46* | (2006.01) |
| *A61K 38/48* | (2006.01) |
| *A61K 38/53* | (2006.01) |
| *A61K 48/00* | (2006.01) |

(52) U.S. Cl.
CPC ...... *A61K 39/3955* (2013.01); *A61K 31/5377* (2013.01); *A61K 31/573* (2013.01); *A61K 31/675* (2013.01); *A61K 31/69* (2013.01); *A61K 38/1825* (2013.01); *A61K 38/36* (2013.01); *A61K 38/37* (2013.01); *A61K 38/44* (2013.01); *A61K 38/45* (2013.01); *A61K 38/46* (2013.01); *A61K 38/465* (2013.01); *A61K 38/48* (2013.01); *A61K 38/4873* (2013.01); *A61K 38/53* (2013.01); *A61K 48/0083* (2013.01)

(58) Field of Classification Search
CPC .......... C12N 15/86; C12N 2750/14143; A61P 37/06; A61P 43/00
See application file for complete search history.

(56) References Cited

U.S. PATENT DOCUMENTS

| | | |
|---|---|---|
| 7,282,199 B2 | 10/2007 | Gao et al. |
| 7,790,449 B2 | 9/2010 | Gao et al. |
| 7,906,111 B2 | 3/2011 | Wilson et al. |
| 8,323,653 B2 | 12/2012 | Damschroder et al. |
| 8,524,867 B2 | 9/2013 | Bernett et al. |
| 8,734,809 B2 | 5/2014 | Gao et al. |
| 8,883,992 B2 | 11/2014 | Damschroder et al. |
| 8,927,514 B2 | 1/2015 | Chatterjee et al. |
| 9,506,083 B2 | 11/2016 | Arbetman et al. |
| 9,585,971 B2 | 3/2017 | Deverman et al. |
| 9,587,282 B2 | 3/2017 | Schaffer et al. |
| 9,611,302 B2 | 4/2017 | Srivastava et al. |
| 9,725,485 B2 | 8/2017 | Srivastava et al. |
| 9,803,020 B2 | 10/2017 | Bernett et al. |
| 9,856,539 B2 | 1/2018 | Schaffer et al. |
| 9,896,505 B2 | 2/2018 | Damschroder et al. |
| 9,909,142 B2 | 3/2018 | Yazicioglu et al. |
| 9,920,097 B2 | 3/2018 | Zhong et al. |
| 10,011,640 B2 | 7/2018 | Srivastava et al. |
| 10,081,659 B2 | 9/2018 | Chiorini et al. |
| 10,179,176 B2 | 1/2019 | Kay et al. |

(Continued)

FOREIGN PATENT DOCUMENTS

| | | |
|---|---|---|
| EP | 1310571 A2 | 5/2003 |
| WO | WO-2003/042397 A2 | 5/2003 |

(Continued)

OTHER PUBLICATIONS

C.R.O'Riordan et al. Glycobiology, 2000, vol. 10 (11), pp. 1225-1233.*

(Continued)

*Primary Examiner* — Bao Q Li
(74) *Attorney, Agent, or Firm* — Antheros Legal Advisors

(57) ABSTRACT

Provided herein are methods for managing host immune responses to improve therapeutic outcomes in adeno-associated virus (AAV)-mediated gene therapy. Such methods may include administering a recombinant adeno-associated virus (rAAV) to a subject following administration of a CD 19 inhibitor, e.g., an anti-CD 19 antibody. The methods described herein can facilitate improved transgene expression, help overcome pre-existing NAbs, and/or permit redosing with the same or substantially similar rAAV or transgene.

20 Claims, No Drawings
Specification includes a Sequence Listing.

(56) References Cited

U.S. PATENT DOCUMENTS

| | | |
|---|---|---|
| 10,202,657 B2 | 2/2019 | Schaffer et al. |
| 10,214,566 B2 | 2/2019 | Schaffer et al. |
| 10,214,785 B2 | 2/2019 | Schaffer et al. |
| 10,266,845 B2 | 4/2019 | Cronin et al. |
| 10,294,281 B2 | 5/2019 | Srivastava et al. |
| 10,301,648 B2 | 5/2019 | Vandenberghe et al. |
| 10,385,320 B2 | 8/2019 | Kay et al. |
| 10,392,632 B2 | 8/2019 | Wright et al. |
| 2007/0036760 A1 | 2/2007 | Wilson et al. |
| 2009/0197338 A1 | 8/2009 | Vandenberghe et al. |
| 2012/0219528 A1 | 8/2012 | Sista et al. |
| 2015/0344911 A1 | 12/2015 | Chatterjee et al. |
| 2016/0067228 A1 | 3/2016 | Kishimoto |
| 2017/0021114 A1 | 1/2017 | Vonarburg et al. |
| 2018/0023070 A1 | 1/2018 | Kjellman et al. |
| 2018/0037962 A1 | 2/2018 | Kjellman et al. |

FOREIGN PATENT DOCUMENTS

| | | |
|---|---|---|
| WO | WO-2005/012493 A2 | 2/2005 |
| WO | WO-2005/033321 A2 | 4/2005 |
| WO | WO-2006/089133 A2 | 8/2006 |
| WO | WO-2007/002223 A2 | 1/2007 |
| WO | WO-2007/076950 A1 | 7/2007 |
| WO | WO-2007/082715 A2 | 7/2007 |
| WO | WO-2008/022152 A2 | 2/2008 |
| WO | WO-2008/031056 A2 | 3/2008 |
| WO | WO-2009/052431 A2 | 4/2009 |
| WO | WO-2009/054863 A2 | 4/2009 |
| WO | WO-2010/053716 A1 | 5/2010 |
| WO | WO-2010/095031 A2 | 8/2010 |
| WO | WO-2010/102276 A2 | 9/2010 |
| WO | WO-2011/097456 A2 | 8/2011 |
| WO | WO-2011/139379 A2 | 11/2011 |
| WO | WO-2011/147834 A1 | 12/2011 |
| WO | WO-2012/010561 A1 | 1/2012 |
| WO | WO-2012/057765 A1 | 5/2012 |
| WO | WO-2015/074085 A1 | 5/2015 |
| WO | WO-2015/164758 A1 | 10/2015 |
| WO | WO-2016/033570 A1 | 3/2016 |
| WO | WO-2016/049230 A1 | 3/2016 |
| WO | WO-2016/081029 A1 | 5/2016 |
| WO | WO-2017/015783 A1 | 2/2017 |
| WO | WO-2017/055328 A1 | 4/2017 |
| WO | WO-2017/066136 A2 | 4/2017 |
| WO | WO-2017/117530 A1 | 7/2017 |
| WO | WO-2017/134274 A1 | 8/2017 |
| WO | WO-2017/165859 A1 | 9/2017 |
| WO | WO-2018/002031 A1 | 1/2018 |
| WO | WO-2018/022905 A2 | 2/2018 |
| WO | WO-2018/108106 A1 | 6/2018 |
| WO | WO-2018/118102 A1 | 6/2018 |
| WO | WO-2018/119163 A1 | 6/2018 |
| WO | WO-2018/126369 A1 | 7/2018 |
| WO | WO-2018/156654 A1 | 8/2018 |
| WO | WO-2018/222518 A1 | 12/2018 |
| WO | WO-2018/222926 A1 | 12/2018 |
| WO | WO-2018/226602 A1 | 12/2018 |
| WO | WO-2019/057100 A1 | 3/2019 |
| WO | WO-2019/075360 A1 | 4/2019 |
| WO | WO-2019/191780 A1 | 10/2019 |
| WO | WO-2020/016318 A1 | 1/2020 |
| WO | WO-2020/118239 A1 | 6/2020 |
| WO | WO-2020/154746 A1 | 7/2020 |
| WO | WO-2020/159970 A1 | 8/2020 |

OTHER PUBLICATIONS

Zhang et al. Proc. Natl. Acad. Sci. USA, 1998, vol. 95, pp. 10158-10163.*

Keogh et al. Arthritis Rheum 2005,, 52(1): 262-268.*

Herbst et al. Journal of Pharmaccology and Experimental Therapeutics 2010, vol. 335, No. 1, pp. 213-222.*

Wu et al. Molecular Therapy, 2010, vol. 18, No. 1, pp. 80-86.*

Agius et al. Multiple Sclerosis Journal , published on 2019, vol. 25 (2), p. 235-245.*

Agius et al. (2017) "Safety and tolerability of inebilizumab (MEDI-551), an anti-CD19 monoclonal antibody, in patients with relapsing forms of multiple sclerosis: Results from a phase 1 randomised, placebo-controlled, escalating intravenous and subcutaneous dose study," DOI: 10.1177/1352458517740641 pp. 1-11.

Amanna et al. (2007) "Duration of Humoral Immunity to Common Viral and Vaccine Antigens," NEJM 357(19):1903-15.

Bessis et al., 2004, "Immune responses to gene therapy vectors: influence on vector function and effector mechanisms" Gene Therapy 11, S10-S17.

Bhoj et al. (2016) "Persistence of long-lived plasma cells and humoral immunity in individuals responding to CD19-directed CAR T-cell therapy," Blood 128(3):360-370.

Brynjolfsson et al. (2017) "Long-lived plasma cells in human bone marrow can be either CD19l or CD19-" Blood Adv. 1:835-838.

Chen et al. (2016) "Inebilizumab, a B Cell-Depleting Anti-CD19 Antibody for the Treatment of Autoimmune Neurological Diseases: Insights from Preclinical Studies," 5(107); doi:10.3390/jcm5120107 (12 pages).

Choi et al., "AAV hybrid serotypes: improved vectors for gene delivery," Curr Gene Ther. (2005) vol. 5(3):299-310 (20 pages).

Clinical Trial No. NCT02240407 (Re-administration of Intramuscular AAV9 in Patients with Late-Onset Pompe Disease (AAV9-GAA_IM)) (13 pages).

Clinical Trial No. NCT02525172 ("Immune Modulation Therapy for Pompe Disease") (6 pages).

Collin et al. (2017) "Toward Clinical use of the IgG Specific Enzymes IdeS and EndoS against Antibody-Mediated Diseases," Bacterial Pathogenesis: Methods and Protocols, Methods in Molecular Biology, 1535:339-351.

Corti et al. (2014) "B-cell depletion is protective against anti-AAV capsid immune response: a human subject case study," Molecular Therapy—Methods & Clinical Development 1, 14033; doi: 10.1038/mtm.2014.33 (7 pages).

Crotty et al. (2003) "Cutting Edge: Long-Term B Cell Memory in Humans after Smallpox Vaccination" The Journal of Immunology, 171:4969-4973.

Forsthuber et al. (2018) "B cell-based therapies in CNS autoimmunity: differentiating CD19 and CD20 as therapeutic targets," Ther Adv Neurol Disord 11:1-13.

Gao et al. (2005) "New Recombinant Serotypes of AAV Vectors," Curr Gene Ther. 5(3):285-297.

International Search Report and Written Opinion for PCT/US2020/053805, dated Jan. 14, 2021 (17 pages).

Jordan et al. (2017) "IgG Endopeptidase in Highly Sensitized Patients Undergoing Transplantation," The New England Journal of Medicine 377:442-453.

Lamphier et al. (2014) "Novel Small Molecule Inhibitors of TLR7 and TLR9: Mechanism of Action and Efficacy In Vivo" Mol Pharmacol. 85(3):429-40.

Mei et al. (2015) "A unique population of IgG-expressing plasma cells lacking CD19 is enriched in human bone marrow" Blood 125(11):1739-1748.

Owczarczyk et al.(2011) "A Plasmablast Biomarker for Nonresponse to Antibody Therapy to CD20 in Rheumatoid Arthritis" Science Translational Medicine 3(101), 101ra92 (11 pages).

Schiopu et al. (2016) "Safety and tolerability of an anti-CD19 monoclonal antibody, MEDI-551, in subjects with systemic sclerosis: a phase I, randomized, placebo-controlled, escalating single-dose study," Arthritis Research & Therapy 18:131 (14 pages).

Streicher et al. (2018) "Baseline Plasma Cell Gene Signature Predicts Improvement in Systemic Sclerosis Skin Scores Following Treatment With Inebilizumab (MEDI-551) and Correlates With Disease Activity in Systemic Lupus Erythematosus and Chronic Obstructive Pulmonary Disease," 70(12):2087-2095.

Thaci et al. (2011) "The Challenge for Gene Therapy: Innate Immune Response to Adenoviruses," Oncotarget 2(3):113-121.

(56) References Cited

OTHER PUBLICATIONS

Yazawa et al. (2005) "Immunotherapy using unconjugated CD19 monoclonal antibodies in animal models for B lymphocyte malignancies and autoimmune disease," PNAS 102(42):15178-15183.

\* cited by examiner

SEQUENCE LISTING

<160> NUMBER OF SEQ ID NOS: 21

<210> SEQ ID NO 1
<211> LENGTH: 121
<212> TYPE: PRT
<213> ORGANISM: Artificial Sequence
<220> FEATURE:
<223> OTHER INFORMATION: Description of Artificial Sequence: Heavy Chain
      Variable Region - VH

<400> SEQUENCE: 1

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Ser
            20                  25                  30

Trp Met Asn Trp Val Arg Gln Ala Pro Gly Lys Gly Leu Glu Trp Val
        35                  40                  45

Gly Arg Ile Tyr Pro Gly Asp Gly Asp Thr Asn Tyr Asn Val Lys Phe
    50                  55                  60

Lys Gly Arg Phe Thr Ile Ser Arg Asp Asp Ser Lys Asn Ser Leu Tyr
65                  70                  75                  80

Leu Gln Met Asn Ser Leu Lys Thr Glu Asp Thr Ala Val Tyr Tyr Cys
                85                  90                  95

Ala Arg Ser Gly Phe Ile Thr Thr Val Arg Asp Phe Asp Tyr Trp Gly
            100                 105                 110

Gln Gly Thr Leu Val Thr Val Ser Ser
        115                 120

<210> SEQ ID NO 2
<211> LENGTH: 111
<212> TYPE: PRT
<213> ORGANISM: Artificial Sequence
<220> FEATURE:
<223> OTHER INFORMATION: Description of Artificial Sequence: Light Chain
      Variable Region - VL

<400> SEQUENCE: 2

Glu Ile Val Leu Thr Gln Ser Pro Asp Phe Gln Ser Val Thr Pro Lys
1               5                   10                  15

Glu Lys Val Thr Ile Thr Cys Arg Ala Ser Glu Ser Val Asp Thr Phe
            20                  25                  30

```
Gly Ile Ser Phe Met Asn Trp Phe Gln Gln Lys Pro Asp Gln Ser Pro
            35                  40                  45

Lys Leu Leu Ile His Glu Ala Ser Asn Gln Gly Ser Gly Val Pro Ser
 50                  55                  60

Arg Phe Ser Gly Ser Gly Ser Gly Thr Asp Phe Thr Leu Thr Ile Asn
 65                  70                  75                  80

Ser Leu Glu Ala Glu Asp Ala Ala Thr Tyr Tyr Cys Gln Gln Ser Lys
                 85                  90                  95

Glu Val Pro Phe Thr Phe Gly Gly Gly Thr Lys Val Glu Ile Lys
            100                 105                 110

<210> SEQ ID NO 3
<211> LENGTH: 5
<212> TYPE: PRT
<213> ORGANISM: Artificial Sequence
<220> FEATURE:
<223> OTHER INFORMATION: Description of Artificial Sequence: Heavy Chain
      Variable Region CDR1

<400> SEQUENCE: 3

Ser Ser Trp Met Asn
1               5

<210> SEQ ID NO 4
<211> LENGTH: 17
<212> TYPE: PRT
<213> ORGANISM: Artificial Sequence
<220> FEATURE:
<223> OTHER INFORMATION: Description of Artificial Sequence: Heavy Chain
      Variable Region CDR2

<400> SEQUENCE: 4

Arg Ile Tyr Pro Gly Asp Gly Asp Thr Asn Tyr Asn Val Lys Phe Lys
1               5                   10                  15

Gly

<210> SEQ ID NO 5
<211> LENGTH: 12
<212> TYPE: PRT
<213> ORGANISM: Artificial Sequence
<220> FEATURE:
<223> OTHER INFORMATION: Description of Artificial Sequence: Heavy Chain
      Variable Region CDR3

<400> SEQUENCE: 5

Ser Gly Phe Ile Thr Thr Val Arg Asp Phe Asp Tyr
1               5                   10

<210> SEQ ID NO 6
<211> LENGTH: 15
<212> TYPE: PRT
<213> ORGANISM: Artificial Sequence
<220> FEATURE:
<223> OTHER INFORMATION: Description of Artificial Sequence: Light Chain
      Variable Region CDR1

<400> SEQUENCE: 6

Arg Ala Ser Glu Ser Val Asp Thr Phe Gly Ile Ser Phe Met Asn
1               5                   10                  15

<210> SEQ ID NO 7
<211> LENGTH: 7
<212> TYPE: PRT
<213> ORGANISM: Artificial Sequence
<220> FEATURE:
```

```
<223> OTHER INFORMATION: Description of Artificial Sequence: Light Chain
      Variable Region CDR2

<400> SEQUENCE: 7

Glu Ala Ser Asn Gln Gly Ser
1               5

<210> SEQ ID NO 8
<211> LENGTH: 9
<212> TYPE: PRT
<213> ORGANISM: Artificial Sequence
<220> FEATURE:
<223> OTHER INFORMATION: Description of Artificial Sequence: Light Chain
      Variable Region CDR3

<400> SEQUENCE: 8

Gln Gln Ser Lys Glu Val Pro Phe Thr
1               5

<210> SEQ ID NO 9
<211> LENGTH: 121
<212> TYPE: PRT
<213> ORGANISM: Artificial Sequence
<220> FEATURE:
<223> OTHER INFORMATION: Description of Artificial Sequence: Heavy Chain
      Variable Region - VH

<400> SEQUENCE: 9

Glu Val Gln Leu Val Glu Ser Gly Gly Gly Leu Val Lys Pro Gly Gly
1               5                   10                  15

Ser Leu Lys Leu Ser Cys Ala Ala Ser Gly Tyr Thr Phe Thr Ser Tyr
            20                  25                  30

Val Met His Trp Val Arg Gln Ala Pro Gly Lys Gly Leu Glu Trp Ile
        35                  40                  45

Gly Tyr Ile Asn Pro Tyr Asn Asp Gly Thr Lys Tyr Asn Glu Lys Phe
    50                  55                  60

Gln Gly Arg Val Thr Ile Ser Ser Asp Lys Ser Ile Ser Thr Ala Tyr
65                  70                  75                  80

Met Glu Leu Ser Ser Leu Arg Ser Glu Asp Thr Ala Met Tyr Tyr Cys
                85                  90                  95

Ala Arg Gly Thr Tyr Tyr Tyr Gly Thr Arg Val Phe Asp Tyr Trp Gly
            100                 105                 110

Gln Gly Thr Leu Val Thr Val Ser Ser
        115                 120

<210> SEQ ID NO 10
<211> LENGTH: 112
<212> TYPE: PRT
<213> ORGANISM: Artificial Sequence
<220> FEATURE:
<223> OTHER INFORMATION: Description of Artificial Sequence: Light Chain
      Variable Region - VL

<400> SEQUENCE: 10

Asp Ile Val Met Thr Gln Ser Pro Ala Thr Leu Ser Leu Ser Pro Gly
1               5                   10                  15

Glu Arg Ala Thr Leu Ser Cys Arg Ser Ser Lys Ser Leu Gln Asn Val
            20                  25                  30

Asn Gly Asn Thr Tyr Leu Tyr Trp Phe Gln Gln Lys Pro Gly Gln Ser
        35                  40                  45

Pro Gln Leu Leu Ile Tyr Arg Met Ser Asn Leu Asn Ser Gly Val Pro
    50                  55                  60
```

```
Asp Arg Phe Ser Gly Ser Gly Ser Gly Thr Glu Phe Thr Leu Thr Ile
 65                  70                  75                  80

Ser Ser Leu Glu Pro Glu Asp Phe Ala Val Tyr Tyr Cys Met Gln His
                 85                  90                  95

Leu Glu Tyr Pro Ile Thr Phe Gly Ala Gly Thr Lys Leu Glu Ile Lys
            100                 105                 110
```

```
<210> SEQ ID NO 11
<211> LENGTH: 5
<212> TYPE: PRT
<213> ORGANISM: Artificial Sequence
<220> FEATURE:
<223> OTHER INFORMATION: Description of Artificial Sequence: Heavy Chain
      Variable Region CDR1

<400> SEQUENCE: 11

Ser Tyr Val Met His
1               5

<210> SEQ ID NO 12
<211> LENGTH: 6
<212> TYPE: PRT
<213> ORGANISM: Artificial Sequence
<220> FEATURE:
<223> OTHER INFORMATION: Description of Artificial Sequence: Heavy Chain
      Variable Region CDR2

<400> SEQUENCE: 12

Asn Pro Tyr Asn Asp Gly
1               5

<210> SEQ ID NO 13
<211> LENGTH: 12
<212> TYPE: PRT
<213> ORGANISM: Artificial Sequence
<220> FEATURE:
<223> OTHER INFORMATION: Description of Artificial Sequence: Heavy Chain
      Variable Region CDR3

<400> SEQUENCE: 13

Gly Thr Tyr Tyr Tyr Gly Thr Arg Val Phe Asp Tyr
1               5                   10

<210> SEQ ID NO 14
<211> LENGTH: 16
<212> TYPE: PRT
<213> ORGANISM: Artificial Sequence
<220> FEATURE:
<223> OTHER INFORMATION: Description of Artificial Sequence: Light Chain
      Variable Region CDR1

<400> SEQUENCE: 14

Arg Ser Ser Lys Ser Leu Gln Asn Val Asn Gly Asn Thr Tyr Leu Tyr
1               5                   10                  15

<210> SEQ ID NO 15
<211> LENGTH: 7
<212> TYPE: PRT
<213> ORGANISM: Artificial Sequence
<220> FEATURE:
<223> OTHER INFORMATION: Description of Artificial Sequence: Light Chain
      Variable Region CDR2

<400> SEQUENCE: 15

Arg Met Ser Asn Leu Asn Ser
1               5
```

<210> SEQ ID NO 16
<211> LENGTH: 9
<212> TYPE: PRT
<213> ORGANISM: Artificial Sequence
<220> FEATURE:
<223> OTHER INFORMATION: Description of Artificial Sequence: Light Chain
      Variable Region CDR3

<400> SEQUENCE: 16

Met Gln His Leu Glu Tyr Pro Ile Thr
1               5

<210> SEQ ID NO 17
<211> LENGTH: 145
<212> TYPE: DNA
<213> ORGANISM: Artificial Sequence
<220> FEATURE:
<223> OTHER INFORMATION: Description of Artificial Sequence: AAV2 ITR

<400> SEQUENCE: 17
ttggccactc cctctctgcg cgctcgctcg ctcactgagg ccgggcgacc aaaggtcgcc      60
cgacgcccgg gctttgcccg ggcggcctca gtgagcgagc gagcgcgcag agagggagtg     120
gccaactcca tcactagggg ttcct                                           145

<210> SEQ ID NO 18
<211> LENGTH: 2211
<212> TYPE: DNA
<213> ORGANISM: Artificial Sequence
<220> FEATURE:
<223> OTHER INFORMATION: Description of Artificial Sequence: AAV9
      Nucleic Acid Sequence

<400> SEQUENCE: 18
atggctgccg atggttatct tccagattgg ctcgaggaca accttagtga aggaattcgc      60
gagtggtggg ctttgaaacc tggagcccct caacccaagg caaatcaaca acatcaagac     120
aacgctcgag gtcttgtgct tccgggttac aaataccttg acccggcaa cggactcgac      180 aaggggagc cggtcaacgc agcagacgcg gcggccctcg agcacgacaa ggcctacgac     240
cagcagctca aggccggaga caacccgtac ctcaagtaca accacgccga cgccgagttc     300
caggagcggc tcaaagaaga tacgtctttt gggggcaacc tcgggcgagc agtcttccag     360
gccaaaaaga ggcttcttga acctcttggt ctggttgagg aagcggctaa gacggctcct     420
ggaaagaaga ggcctgtaga gcagtctcct caggaaccgg actcctccgc gggtattggc     480
aaatcgggtg cacagcccgc taaaaagaga ctcaatttcg gtcagactgg cgacacagag     540
tcagtcccag accctcaacc aatcggagaa cctcccgcag cccccctcag tgtgggatct     600
cttacaatgg cttcaggtgg tggcgcacca gtggcagaca taacgaagg tgccgatgga     660 gtgggtagtt cctcgggaaa ttggcattgc gattcccaat ggctggggga cagagtcatc     720
accaccagca cccgaacctg ggccctgccc acctacaaca tcacctcta caagcaaatc     780 tccaacagca catctggagg atcttcaaat gacaacgcct acttcggcta cagcaccccc     840
tgggggtatt ttgacttcaa cagattccac tgccacttct caccacgtga ctggcagcga     900
ctcatcaaca caactgggg attccggcct aagcgactca acttcaagct cttcaacatt     960
caggtcaaag aggttacgga caacaatgga gtcaagacca cgccaataa ccttaccagc    1020 acggtccagg tcttcacgga ctcagactat cagctcccgt acgtgctcgg tcggctcac    1080 gagggctgcc tcccgccgtt cccagcggac gttttcatga ttcctcagta cgggtatctg    1140

-continued

```
acgcttaatg atggaagcca ggccgtgggt cgttcgtcct tttactgcct ggaatatttc   1200
ccgtcgcaaa tgctaagaac gggtaacaac ttccagttca gctacgagtt tgagaacgta   1260
cctttccata gcagctacgc tcacagccaa agcctggacc gactaatgaa tccactcatc   1320
gaccaatact tgtactatct ctcaaagact attaacggtt ctggacagaa tcaacaaacg   1380
ctaaaattca gtgtggccgg acccagcaac atggctgtcc agggaagaaa ctacatacct   1440
ggacccagct accgacaaca acgtgtctca accactgtga ctcaaaacaa caacagcgaa   1500
tttgcttggc ctggagcttc ttcttgggct ctcaatggac gtaatagctt gatgaatcct   1560
ggacctgcta tggccagcca caagaagga gaggaccgtt tctttccttt gtctggatct   1620 ttaattttg gcaaacaagg aactggaaga gacaacgtgg atgcggacaa agtcatgata   1680
accaacgaag aagaaattaa aactactaac ccggtagcaa cggagtccta tggacaagtg   1740
gccacaaacc accagagtgc ccaagcacag gcgcagaccg gctgggttca aaaccaagga   1800
atacttccgg gtatggtttg gcaggacaga gatgtgtacc tgcaaggacc catttgggcc   1860
aaaattcctc acacggacgg caactttcac ccttctccgc tgatgggagg gtttggaatg   1920
aagcacccgc ctcctcagat cctcatcaaa aacacacctg tacctgcgga tcctccaacg   1980
gccttcaaca aggacaagct gaactctttc atcacccagt attctactgg ccaagtcagc   2040
gtggagatcg agtgggagct gcagaaggaa aacagcaagc gctggaaccc ggagatccag   2100
tacacttcca actattacaa gtctaataat gttgaatttg ctgttaatac tgaaggtgta   2160
tatagtgaac cccgccccat tggcaccaga tacctgactc gtaatctgta a            2211
```

<210> SEQ ID NO 19
<211> LENGTH: 736
<212> TYPE: PRT
<213> ORGANISM: Artificial Sequence
<220> FEATURE:
<223> OTHER INFORMATION: Description of Artificial Sequence: AAV9 Amino
      Acid Sequence

<400> SEQUENCE: 19

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
```

```
                165                 170                 175
Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Asn Gly Ser Gly Gln Asn Gln Gln Thr Leu Lys Phe Ser
    450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
            580                 585                 590
```

```
Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Gly Phe Gly Met
625                 630                 635                 640

Lys His Pro Pro Gln Ile Leu Ile Lys Asn Thr Pro Val Pro Ala
            645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
        690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 20
<211> LENGTH: 310
<212> TYPE: PRT
<213> ORGANISM: Artificial Sequence
<220> FEATURE:
<223> OTHER INFORMATION: Description of Artificial Sequence:
      Streptococcus pyogenes IdeS

<400> SEQUENCE: 20

Asp Ser Phe Ser Ala Asn Gln Glu Ile Arg Tyr Ser Glu Val Thr Pro
1               5                   10                  15

Tyr His Val Thr Ser Val Trp Thr Lys Gly Val Thr Pro Pro Ala Asn
            20                  25                  30

Phe Thr Gln Gly Glu Asp Val Phe His Ala Pro Tyr Val Ala Asn Gln
        35                  40                  45

Gly Trp Tyr Asp Ile Thr Lys Thr Phe Asn Gly Lys Asp Asp Leu Leu
    50                  55                  60

Cys Gly Ala Ala Thr Ala Gly Asn Met Leu His Trp Trp Phe Asp Gln
65                  70                  75                  80

Asn Lys Asp Gln Ile Lys Arg Tyr Leu Glu Glu His Pro Glu Lys Gln
                85                  90                  95

Lys Ile Asn Phe Asn Gly Glu Gln Met Phe Asp Val Lys Glu Ala Ile
            100                 105                 110

Asp Thr Lys Asn His Gln Leu Asp Ser Lys Leu Phe Glu Tyr Phe Lys
        115                 120                 125

Glu Lys Ala Phe Pro Tyr Leu Ser Thr Lys His Leu Gly Val Phe Pro
    130                 135                 140

Asp His Val Ile Asp Met Phe Ile Asn Gly Tyr Arg Leu Ser Leu Thr
145                 150                 155                 160

Asn His Gly Pro Thr Pro Val Lys Glu Gly Ser Lys Asp Pro Arg Gly
                165                 170                 175

Gly Ile Phe Asp Ala Val Phe Thr Arg Gly Asp Gln Ser Lys Leu Leu
            180                 185                 190

Thr Ser Arg His Asp Phe Lys Glu Lys Asn Leu Lys Glu Ile Ser Asp
        195                 200                 205

Leu Ile Lys Lys Glu Leu Thr Glu Gly Lys Ala Leu Gly Leu Ser His
```

```
                210                 215                 220
Thr Tyr Ala Asn Val Arg Ile Asn His Val Ile Asn Leu Trp Gly Ala
225                 230                 235                 240

Asp Phe Asp Ser Asn Gly Asn Leu Lys Ala Ile Tyr Val Thr Asp Ser
                245                 250                 255

Asp Ser Asn Ala Ser Ile Gly Met Lys Lys Tyr Phe Val Gly Val Asn
                260                 265                 270

Ser Ala Gly Lys Val Ala Ile Ser Ala Lys Glu Ile Lys Glu Asp Asn
            275                 280                 285

Ile Gly Ala Gln Val Leu Gly Leu Phe Thr Leu Ser Thr Gly Gln Asp
            290                 295                 300

Ser Trp Asn Gln Thr Asn
305                 310

<210> SEQ ID NO 21
<211> LENGTH: 349
<212> TYPE: PRT
<213> ORGANISM: Artificial Sequence
<220> FEATURE:
<223> OTHER INFORMATION: Description of Artificial Sequence:
      Streptococcus equi IdeZ

<400> SEQUENCE: 21

Met Lys Thr Ile Ala Tyr Pro Asn Lys Pro His Ser Leu Ser Ala Gly
1               5                   10                  15

Leu Leu Thr Ala Ile Ala Ile Phe Ser Leu Ala Ser Ser Asn Ile Thr
                20                  25                  30

Tyr Ala Asp Asp Tyr Gln Arg Asn Ala Thr Glu Ala Tyr Ala Lys Glu
            35                  40                  45

Val Pro His Gln Ile Thr Ser Val Trp Ser Lys Gly Val Thr Pro Leu
        50                  55                  60

Thr Pro Glu Gln Phe Arg Tyr Asn Asn Glu Asp Val Ile His Ala Pro
65                  70                  75                  80

Tyr Leu Ala His Gln Gly Trp Tyr Asp Ile Thr Lys Ala Phe Asp Gly
                85                  90                  95

Lys Asp Asn Leu Leu Cys Gly Ala Ala Thr Ala Gly Asn Met Leu His
            100                 105                 110

Trp Trp Phe Asp Gln Asn Lys Thr Glu Ile Glu Ala Tyr Leu Ser Lys
        115                 120                 125

His Pro Glu Lys Gln Lys Ile Ile Phe Asn Asn Gln Glu Leu Phe Asp
130                 135                 140

Leu Lys Ala Ala Ile Asp Thr Lys Asp Ser Gln Thr Asn Ser Gln Leu
145                 150                 155                 160

Phe Asn Tyr Phe Arg Asp Lys Ala Phe Pro Asn Leu Ser Ala Arg Gln
                165                 170                 175

Leu Gly Val Met Pro Asp Leu Val Leu Asp Met Phe Ile Asn Gly Tyr
            180                 185                 190

Tyr Leu Asn Val Phe Lys Thr Gln Ser Thr Asp Val Asn Arg Pro Tyr
        195                 200                 205

Gln Asp Lys Asp Lys Arg Gly Gly Ile Phe Asp Ala Val Phe Thr Arg
    210                 215                 220

Gly Asp Gln Thr Thr Leu Leu Thr Ala Arg His Asp Leu Lys Asn Lys
225                 230                 235                 240

Gly Leu Asn Asp Ile Ser Thr Ile Ile Lys Gln Glu Leu Thr Glu Gly
                245                 250                 255
```

-continued

```
Arg Ala Leu Ala Leu Ser His Thr Tyr Ala Asn Val Ser Ile Ser His
            260                 265                 270

Val Ile Asn Leu Trp Gly Ala Asp Phe Asn Ala Glu Gly Asn Leu Glu
        275                 280                 285

Ala Ile Tyr Val Thr Asp Ser Asp Ala Asn Ala Ser Ile Gly Met Lys
        290                 295                 300

Lys Tyr Phe Val Gly Ile Asn Ala His Gly His Val Ala Ile Ser Ala
305                 310                 315                 320

Lys Lys Ile Glu Gly Glu Asn Ile Gly Ala Gln Val Leu Gly Leu Phe
                325                 330                 335

Thr Leu Ser Ser Gly Lys Asp Ile Trp Gln Lys Leu Ser
            340                 345
```

METHODS FOR IMPROVED THERAPEUTIC USE OF RECOMBINANT AAV

CROSS-REFERENCE TO RELATED APPLICATIONS

This application is a U.S. national stage application, filed under 35 U.S.C. § 371, of International Application No. PCT/US2020/053805, filed on Oct. 1, 2020, which claims the benefit of and priority to U.S. Provisional Application No. 62/910,790, filed on Oct. 4, 2019, the entire disclosure of each of which are hereby incorporated by reference herein in its entirety for all purposes.

SEQUENCE LISTING

The instant application contains a Sequence Listing which has been submitted electronically in ASCII format and is hereby incorporated by reference in its entirety. Said ASCII copy, created on Mar. 28, 2022, is named ULP-006WOUS_SL_ST25.txt and is 23,811 bytes in size.

TECHNICAL FIELD OF THE INVENTION

The present disclosure relates generally to methods for managing host immune responses to improve therapeutic outcomes in adeno-associated virus (AAV)-mediated gene therapy.

BACKGROUND OF THE INVENTION

A major challenge to the successful application of AAV-mediated gene therapy is the induction of innate and adaptive immune responses to the AAV capsid, vector DNA, and transgene product (See Corti et al., 2014, *Mol Ther Methods Clin Dev* 1, 14033). The innate immune response to a gene therapy product (e.g., a recombinant AAV, i.e., rAAV) may eliminate the product and transfected cells, decreasing both the intensity and duration of transgene expression (See Bessis et al., 2004, *Gene Therapy* 11, S10-S17). The adaptive immune response develops later, and plays a crucial role—it includes a humoral response characterized by the production of neutralizing antibodies (NAbs) specific to the capsid or an expressed transgene and a cell-mediated response involving T cells and NK cells (See id.). Adaptive immunity not only contributes to eliminating the AAV product and transfected cells from the body, but also results in a memory response that impedes the delivery of the same rAAV or transgene (See id.). Lastly, some individuals may be exposed naturally to AAV early in life, leading to the induction of AAV NAbs, which can prohibit the use of AAV-based gene therapy in these patients.

For the foregoing reasons, there is a need to manage the host immune response to facilitate improved transgene expression, to overcome pre-existing NAbs, and/or to permit redosing with the same rAAV or transgene. The present invention addresses this need via the pharmacological modulation of the humoral immune response using a CD19 inhibitor, e.g., an anti-CD19 antibody.

SUMMARY OF THE INVENTION

This invention provides methods for managing host immune responses to improve therapeutic outcomes in AAV gene therapy. More specifically, provided herein are methods comprising the administration of a CD19 inhibitor prior to the administration of an AAV gene therapy product.

In a first aspect, the present disclosure provides a method for administering a recombinant adeno-associated virus (rAAV) to a subject, wherein said method comprises first administering a CD19 inhibitor to said subject and thereafter administering the rAAV to said subject.

In one embodiment, the CD19 inhibitor is administered to the subject at least about 12 hours before administration of the rAAV. In another embodiment, the CD19 inhibitor is administered to the subject at least about 24 hours before administration of the rAAV. In yet another embodiment, the CD19 inhibitor is administered to the subject at least about 2 days before administration of the rAAV. In yet another embodiment, the CD19 inhibitor is administered to the subject at least about 3, 4, 5, 6, 7, or more days before administration of the rAAV. In yet another embodiment, the CD19 inhibitor is administered to the subject at least about 7, 14, 21, or more days before administration of the rAAV. In an exemplary embodiment, the CD19 inhibitor is administered to the subject at or about 7 days before administration of the rAAV.

In one embodiment, the CD19 inhibitor is administered once before administration of the rAAV. In another embodiment, the CD19 inhibitor is administered twice before administration of the rAAV. In yet another embodiment, the CD19 inhibitor is administered 3, 4, 5, or more times before administration of the rAAV. In an exemplary embodiment, the CD19 inhibitor is administered once before administration of the rAAV.

In one embodiment, the CD19 inhibitor is selected from an anti-CD19 antibody, an anti-CD19 single-chain variable fragment (scFv), a CD19 antisense oligonucleotide, a CD19 small interfering RNA (siRNA), and a small molecule inhibitor of CD19. In an exemplary embodiment, the CD19 inhibitor is an anti-CD19 antibody.

In various embodiments described herein, the CD19 inhibitor may be an anti-CD19 antibody. In some embodiments, the anti-CD19 antibody may be selected from inebilizumab, tafasitamab, and FMC63. In an exemplary embodiment, the anti-CD19 antibody is inebilizumab.

In certain embodiments where the CD19 inhibitor is an anti-CD19 antibody, the anti-CD19 antibody may be administered at a dose of about 10 mg to about 3000 mg. In some embodiments, the anti-CD19 antibody may be administered at a dose of about 50 mg to about 2000 mg. In some embodiments, the anti-CD19 antibody may be administered at a dose of about 100 mg to about 1000 mg. In some embodiments, the anti-CD19 antibody may be administered at a dose of about 200 mg to about 500 mg. In some embodiments, the anti-CD19 antibody may be administered at a dose of about 250 mg to about 350 mg. In an exemplary embodiment, the anti-CD19 antibody may be administered at a dose of about 300 mg.

In certain embodiments where the CD19 inhibitor is an anti-CD19 antibody, the anti-CD19 antibody may be administered at a dose of about 100 mg, about 200 mg, about 300 mg, about 400 mg, about 500 mg, about 600 mg, about 700 mg, about 800 mg, about 900 mg, or about 1000 mg. In an exemplary embodiment, the anti-CD19 antibody is inebilizumab and is administered at a dose of 300 mg.

In certain embodiments where the CD19 inhibitor is an anti-CD19 antibody, the anti-CD19 antibody may be administered at a dose of about 0.1 mg/kg to about 50 mg/kg. In some embodiments, the anti-CD19 antibody may be administered at a dose of about 1 mg/kg to about 10 mg/kg. In some embodiments, the anti-CD19 antibody may be administered at a dose of about 2 mg/kg to about 8 mg/kg. In some embodiments, the anti-CD19 antibody may be administered at a dose of about 2 mg/kg, about 2.5 mg/kg, about 3 mg/kg, about 3.5 mg/kg, about 4 mg/kg, about 4.5 mg/kg, about 5 mg/kg, about 5.5 mg/kg, about 6 mg/kg, about 6.5 mg/kg, about 7 mg/kg, about 7.5 mg/kg, or about 8 mg/kg.

In certain embodiments where the CD19 inhibitor is an anti-CD19 antibody, the anti-CD19 antibody may formulated in a pharmaceutical composition that comprises the anti-CD19 antibody and a pharmaceutically acceptable carrier or excipient. In some embodiments, the pharmaceutical composition is formulated for subcutaneous, intramuscular, intradermal, intraperitoneal, or intravenous administration. In an exemplary embodiment, the pharmaceutical composition is formulated for intravenous administration.

In some embodiments, the CD19 inhibitor is administered subcutaneously, intramuscularly, intradermally, intraperitoneally, or intravenously. In an exemplary embodiment, the CD19 inhibitor is administered intravenously.

In some embodiments, the method for administering a recombinant adeno-associated virus (rAAV) to a subject may further comprise the administration of intravenous immune globulin (IVIg) before, simultaneous with, or after administration of the CD19 inhibitor. In some embodiments, the CD19 inhibitor and the IVIg may be administered simultaneously. In some embodiments, the CD19 inhibitor and the IVIg may be administered sequentially. In some embodiments, the CD19 inhibitor and the IVIg may be administered separately.

In some embodiments, the method for administering a recombinant adeno-associated virus (rAAV) to a subject may further comprise the administration of a corticosteroid before, simultaneous with, or after administration of the CD19 inhibitor. In some embodiments, the CD19 inhibitor and the corticosteroid may be administered simultaneously. In some embodiments, the CD19 inhibitor and the corticosteroid may be administered sequentially. In some embodiments, the CD19 inhibitor and the corticosteroid may be administered separately. In some embodiments, the corticosteroid is selected from prednisolone, dexamethasone, hydrocortisone, methylprednisolone, betamethasone, cortisone, prednisone, budesonide, and triamcinolone. In some embodiments, the corticosteroid is prednisolone. In some embodiments, the corticosteroid is administered at 60 mg per day. In some embodiments, prednisolone is administered at about 5 days prior to administration of the rAAV. In some embodiments, the corticosteroid is administered at 60 mg per day for 4 weeks with a first dose occurring 5 days prior to administration of the rAAV.

In some embodiments, the method for administering a recombinant adeno-associated virus (rAAV) to a subject may further comprise the administration of an agent before, simultaneous with, or after administration of the CD19 inhibitor. In some embodiments, the CD19 inhibitor and the agent may be administered simultaneously. In some embodiments, the CD19 inhibitor and the agent may be administered sequentially. In some embodiments, the CD19 inhibitor and the agent may be administered separately. In some embodiments, the agent is selected from a proteasome inhibitor, a TLR antagonist, an immunosuppressive macrocycle, an antimetabolite, a cGAS-STING antagonist, IL-2, an IL-2 mutein, an anti-CD38 antibody, an immunomodulatory drug (IMiD), an anti-B-cell maturation antigen (BCMA) agent, an anti-SLAM family member 7 (SLAMF7) antibody, a mammalian target of rapamycin (mTOR) inhibitor, SEL-212, cyclophosphamide, mycophenolate mofetil, a phosphoinositide 3-kinase inhibitor, a Bruton's tyrosine kinase inhibitor, a sphingosine-1-phosphate receptor modulator, an anti-B-cell activating factor (BAFF or also known as tumor necrosis factor ligand superfamily member 13B) inhibitor, or an IgG-degrading protease. In some embodiments, the proteasome inhibitor is selected from bortezomib, carfilzomib, ixazomib, oprozomib, delanzomib, and marizomib. In an exemplary embodiment, the proteasome inhibitor is bortezomib. In some embodiments, the IgG-degrading protease is IdeS of *Streptococcus pyogenes* or an engineered variant thereof. In some embodiments, the IgG-degrading protease is IdeZ of *Streptococcus equi* or an engineered variant thereof.

In some embodiments, the recombinant adeno-associated virus (rAAV) administered according to a method of the application comprises an AAV capsid and a vector genome packaged therein.

In some embodiments, the AAV capsid is from an AAV of serotype 1, 2, 3, 4, 5, 6, 7, 8, 9, 10, 11, 12, rh10, hu37 (i.e., AAV1, AAV2, AAV3, AAV4, AAV5, AAV6, AAV7, AAV9, AAV10, AAV11, AAV12, AAVrh10, AAVhu37), or an engineered variant thereof. In an exemplary embodiment, the AAV capsid is an AAV serotype 9 (AAV9) capsid, an AAV9 variant capsid, an AAV serotype 8 (AAV8) capsid, an AAV8 variant capsid, an AAV serotype 2 (AAV2) capsid, or an AAV serotype hu37 (AAVhu37) capsid.

In some embodiments, the vector genome packaged in the rAAV comprises a coding sequence for a protein transgene. In one embodiment, the coding sequence is a native coding sequence. In another embodiment, the coding sequence is a codon-optimized coding sequence. In some embodiments, coding sequence expresses a protein transgene selected from ornithine transcarbamylase (OTC), glucose 6-phosphatase (G6Pase), factor VIII, factor IX, ATP7B, phenylalanine hydroxylase (PAH), argininosuccinate synthetase, cyclin-dependent kinase-like 5 (CDKL5), propionyl-CoA carboxylase subunit α (PCCA) and propionyl-CoA carboxylase subunit β (PCCB), survival motor neuron (SMN), iduronate-2-sulfatase (IDS), alpha-1-iduronidase (IDUA), tripeptidyl peptidase 1 (TPP1), low-density lipoprotein receptor (LDLR), myotubularin 1, acid alpha-glucosidase (GAA), dystrophia myotonica-protein kinase (DMPK), N-sulfoglucosamine sulfohydrolase (SGSH), fibroblast growth factor-4 (FGF-4), rab escort protein 1 (REP1), carbamoyl synthetase 1 (CPS1), argininosuccinate lyase (ASL), arginase, fumarylacetate hydrolase, alpha-1 antitrypsin, methyl malonyl CoA mutase, a cystic fibrosis transmembrane conductance regulator (CFTR) protein, and a dystrophin gene product (e.g., a minidystrophin or microdystrophin).

In some embodiments, the rAAV is administered subcutaneously, intramuscularly, intradermally, intraperitoneally, intrathecally, intracerebroventricularly, or intravenously. In an exemplary embodiment, the rAAV is administered intravenously. In some embodiments, the rAAV is administered at a dose of about $1 \times 10^{11}$ to about $1 \times 10^{14}$ genome copies (GC)/kg. In further embodiments, the rAAV is administered at a dose of about $1 \times 10^{12}$ to about $1 \times 10^{13}$ genome copies (GC)/kg. In some embodiments, a single dose of rAAV is administered. In other embodiments, multiple doses of rAAV are administered.

In some embodiments, the subject is a human. In one embodiment, the human subject is an adult subject, i.e., a human subject greater than 18 years old. In one embodiment, the human subject is a pediatric subject, i.e., a human subject of ages 0-18 years old inclusive.

In a second aspect, the present disclosure provides a method for administering at least two doses of recombinant adeno-associated virus (rAAV) to a subject, wherein said method comprises:

(a) administering a first dose of a CD19 inhibitor to said subject and thereafter administering a first rAAV to said subject, and (b) administering a second dose of a CD19 inhibitor to said subject and thereafter administering a second rAAV to said subject.

In some embodiments according to this second aspect, the CD19 inhibitor of the first and second doses is the same CD19 inhibitor. Alternatively, the CD19 inhibitor of the first dose may be a different CD19 inhibitor relative to the second dose.

In some embodiments according to this second aspect, the first rAAV and the second rAAV are the same rAAV. Alternatively, in some embodiments, the first rAAV and the second rAAV are different.

In some embodiments according to this second aspect, the first rAAV and the second rAAV contain the same vector capsid. In an alternative embodiment, the first rAAV and the second rAAV contain different vector capsids.

In some embodiments according to this second aspect, the first rAAV and the second rAAV express the same transgene. In an alternative embodiment, the first rAAV and the second rAAV express different transgenes.

In some embodiments according to this second aspect, administration of the first dose of the CD19 inhibitor occurs more than 12 months prior to administration of the second dose of the CD19 inhibitor. In one embodiment, administration of the first dose of the CD19 inhibitor occurs more than 2 years prior to administration of the second dose of the CD19 inhibitor. In another embodiment, administration of the first dose of the CD19 inhibitor occurs more than 3, 4, 5, 6, 7, 8, 9, 10, 15, or 20 years prior to administration of the second dose of the CD19 inhibitor.

In some embodiments according to this second aspect, the CD19 inhibitor of the first dose is an anti-CD19 antibody. In some embodiments according to this second aspect, the CD19 inhibitor of the second dose is an anti-CD19 antibody. In some embodiments according to this second aspect, the CD19 inhibitor of the first and second doses is an anti-CD19 antibody. In one embodiment, the anti-CD19 antibody is selected from inebilizumab, tafasitamab, and FMC63. In an exemplary embodiment, the anti-CD19 antibody is inebilizumab.

In some embodiments according to this second aspect, the amount of CD19 inhibitor administered in the first and second doses is the same. Alternatively, the amount of CD19 inhibitor administered in the first dose may be different than the amount of the CD19 inhibitor administered in the second dose. In an exemplary embodiment, the amount of CD19 inhibitor administered in the first and second doses is the same. In another exemplary embodiment, the CD19 inhibitor is inebilizumab and the first dose is 300 mg and the second dose is 300 mg.

These and other aspects and features of the invention are described in the following sections of the application.

DETAILED DESCRIPTION OF THE INVENTION

This invention provides methods for managing host immune responses to improve therapeutic outcomes in adeno-associated virus (AAV)-mediated gene therapy. In some embodiments, the methods described herein may facilitate improved transgene expression, help overcome pre-existing NAbs, and/or permit redosing with the same or substantially similar rAAV or transgene. In some embodiments, the methods provided by this disclosure include administering a recombinant adeno-associated virus (rAAV) to a subject following administration of a CD19 inhibitor, e.g., an anti-CD19 antibody. Such methods can be useful for the prevention, treatment, or amelioration of various diseases and disorders as further described herein.

Unless otherwise noted, technical terms are used according to conventional usage. Definitions of common terms in molecular biology may be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8).

In order to facilitate review of the various embodiments of the disclosure, the following explanations of specific terms are provided:

Adeno-associated virus (AAV): A small, replication-defective, non-enveloped virus that infects humans and some other primate species. AAV is not known to cause disease and elicits a very mild immune response. Gene therapy vectors that utilize AAV can infect both dividing and quiescent cells and can persist in an extrachromosomal state without integrating into the genome of the host cell. These features make AAV an attractive viral vector for gene therapy. There are currently 12 recognized serotypes of AAV (AAV1-12).

Administration/Administer: To provide or give a subject an agent, such as a therapeutic agent (e.g., a recombinant AAV or a CD19 inhibitor), by any effective route. Exemplary routes of administration include, but are not limited to, injection (such as subcutaneous, intramuscular, intradermal, intraperitoneal, and intravenous), oral, intraductal, sublingual, rectal, transdermal, intranasal, vaginal and inhalation routes.

Antibody: The terms "antibody" or "antibodies" encompass monoclonal antibodies (including full-length monoclonal antibodies), polyclonal antibodies, multi specific antibodies (e.g., bispecific antibodies) formed from at least two intact antibodies, human antibodies, humanized antibodies, camelised antibodies, chimeric antibodies, single-chain Fvs (scFv), single-chain antibodies, single domain antibodies, domain antibodies, Fab fragments, F(ab')2 fragments, antibody fragments that exhibit the desired biological activity, disulfide-linked Fvs (sdFv), and anti-idiotypic (anti-Id) antibodies (including, e.g., anti-Id antibodies to antibodies used in any method of the present disclosure), intrabodies, and epitope-binding fragments of any of the above. In particular, antibodies include immunoglobulin molecules and immunologically active fragments of immunoglobulin molecules, i.e., molecules that contain an antigen-binding site. Immunoglobulin molecules can be of any type (e.g., IgG, IgE, IgM, IgD, IgA and IgY), class (e.g., IgG1, IgG2, IgG3, IgG4, IgA1 and IgA2) or subclass.

Antibody-dependent cell-mediated cytotoxicity: "Antibody-dependent cell-mediated cytotoxicity" and "ADCC" refer to a cell-mediated reaction in which non-specific cytotoxic cells (e.g., Natural Killer (NK) cells, neutrophils, and macrophages) recognize bound antibody on a target cell and subsequently cause lysis of the target cell.

CD19 Inhibitor: A "CD19 inhibitor" refers to an agent that either (a) depletes (i.e., diminishes in number or quantity) cells expressing CD19, e.g., B cells or plasma cells; or (b) directly or indirectly decreases, blocks, inhibits, abrogates, or interferes with signal transduction resulting from the interaction of CD19 with one or more of its binding partners.

Such agents include, but are not limited to, anti-CD19 antibodies, anti-CD19 scFvs, CD19 antisense oligonucleotides, CD19 siRNAs, and small molecule inhibitors of CD19.

Coding Sequence: A "coding sequence" means the nucleotide sequence encoding a polypeptide in vitro or in vivo when operably linked to appropriate regulatory sequences. The coding sequence may or may not include regions preceding and following the coding region, e.g., 5' untranslated (5' UTR) and 3' untranslated (3' UTR) sequences, as well as intervening sequences (introns) between individual coding segments (exons).

Codon-optimized: A "codon-optimized" nucleic acid refers to a nucleic acid sequence that has been altered such that the codons are optimal for expression in a particular system (such as a particular species or group of species). For example, a nucleic acid sequence can be optimized for expression in mammalian cells or in a particular mammalian species (such as human cells). Codon optimization does not alter the amino acid sequence of the encoded protein.

Complement dependent cytotoxicity: "Complement dependent cytotoxicity" and "CDC" refers to the ability of a molecule to initiate complement activation and lyse a target in the presence of complement. The complement activation pathway is initiated by the binding of the first component of the complement system (C1q) to a molecule (e.g., an antibody) complexed with a cognate antigen.

Enhancer: A nucleic acid sequence that increases the rate of transcription by increasing the activity of a promoter.

Intron: A stretch of DNA within a gene that does not contain coding information for a protein. Introns are removed before translation of a messenger RNA.

Inverted terminal repeat (ITR): Symmetrical nucleic acid sequences in the genome of adeno-associated viruses required for efficient replication. ITR sequences are located at each end of the AAV DNA genome. The ITRs serve as the origins of replication for viral DNA synthesis and are essential cis components for generating AAV integrating vectors.

Isolated: An "isolated" biological component (such as a nucleic acid molecule, protein, virus, or cell) has been substantially separated or purified away from other biological components in the cell or tissue of the organism, or the organism itself, in which the component naturally occurs, such as other chromosomal and extra-chromosomal DNA and RNA, proteins, and cells. Nucleic acid molecules and proteins that have been "isolated" include those purified by standard purification methods. The term also embraces nucleic acid molecules and proteins prepared by recombinant expression in a host cell as well as chemically synthesized nucleic acid molecules and proteins.

Operably linked: A first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein-coding regions, in the same reading frame.

Pharmaceutically acceptable carrier: The pharmaceutically acceptable carriers (vehicles) useful in this disclosure are conventional. *Remington's Pharmaceutical Sciences*, by E. W. Martin, Mack Publishing Co., Easton, Pa., 15th Edition (1975), describes compositions and formulations suitable for pharmaceutical delivery of one or more therapeutic compounds, molecules or agents.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Preventing, treating or ameliorating a disease: "Preventing" a disease refers to inhibiting the full development of a disease. "Treating" refers to a therapeutic intervention that ameliorates a sign or symptom of a disease or pathological condition after it has begun to develop. "Ameliorating" refers to the reduction in the number or severity of signs or symptoms of a disease.

Promoter: A region of DNA that directs/initiates transcription of a nucleic acid (e.g., a gene). A promoter includes necessary nucleic acid sequences near the start site of transcription. Many promoter sequences are known to the person skilled in the art and even a combination of different promoter sequences in artificial nucleic acid molecules is possible. As used herein, gene-specific endogenous promoter refers to native promoter element that regulates expression of the endogenous gene of interest.

Purified: The term "purified" does not require absolute purity; rather, it is intended as a relative term. Thus, for example, a purified peptide, protein, virus, or other active compound is one that is isolated in whole or in part from naturally associated proteins and other contaminants. In certain embodiments, the term "substantially purified" refers to a peptide, protein, virus or other active compound that has been isolated from a cell, cell culture medium, or other crude preparation and subjected to fractionation to remove various components of the initial preparation, such as proteins, cellular debris, and other components.

Recombinant: A recombinant nucleic acid molecule is one that has a sequence that is not naturally occurring or has a sequence that is made by an artificial combination of two otherwise separated segments of sequence. This artificial combination can be accomplished by chemical synthesis or by the artificial manipulation of isolated segments of nucleic acid molecules, such as by genetic engineering techniques.

Similarly, a recombinant virus is a virus comprising sequence (such as genomic sequence) that is non-naturally occurring or made by artificial combination of at least two sequences of different origin. The term "recombinant" also includes nucleic acids, proteins, and viruses that have been altered solely by addition, substitution, or deletion of a portion of a natural nucleic acid molecule, protein, or virus. As used herein, "recombinant AAV" refers to an AAV particle in which a recombinant nucleic acid molecule such as a recombinant nucleic acid molecule encoding a transgene has been packaged.

Serotype: A group of closely related microorganisms (such as viruses) distinguished by a characteristic set of antigens.

Stuffer sequence: Refers to a sequence of nucleotides contained within a larger nucleic acid molecule (such as a vector) that is typically used to create desired spacing between two nucleic acid features (such as between a promoter and a coding sequence), or to extend a nucleic acid molecule so that it is of a desired length. Stuffer sequences do not contain protein coding information and can be of unknown/synthetic origin and/or unrelated to other nucleic acid sequences within a larger nucleic acid molecule.

Subject: Living multi-cellular vertebrate organisms, a category that includes human and non-human mammals. In some embodiments, the subject is a human. In one embodiment, the human subject is an adult subject, i.e., a human subject greater than 18 years old. In one embodiment, the human subject is a pediatric subject, i.e., a human subject of ages 0-18 years old inclusive.

Synthetic: Produced by artificial means in a laboratory, for example a synthetic nucleic acid can be chemically synthesized in a laboratory.

Therapeutically effective amount: A quantity of a specified pharmaceutical or therapeutic agent (e.g., a recombinant AAV or a CD19 inhibitor) sufficient to achieve a desired effect in a subject, or in a cell, being treated with the agent. The effective amount of the agent will be dependent on several factors, including, but not limited to the subject or cells being treated, and the manner of administration of the therapeutic composition.

Transgene: A "transgene" refers to a polynucleotide that is introduced into a cell and is capable of being transcribed into RNA and optionally translated and/or expressed under appropriate conditions. The term "transgene" may also be used in reference to the expressed polypeptide, i.e., a protein transgene. The transgene may confer a desired property to a cell into which it was introduced, or otherwise lead to a desired therapeutic outcome. In some instances, the transgene may be transcribed and translated to provide a functionally active protein transgene to a subject suffering from a disorder associated with a deficiency of active protein. Any number of protein transgenes may be delivered in conjunction with the present invention including, but not limited to, ornithine transcarbamylase (OTC), glucose 6-phosphatase (G6Pase), factor VIII, factor IX, ATP7B, phenylalanine hydroxylase (PAH), argininosuccinate synthetase, cyclin-dependent kinase-like 5 (CDKL5), propionyl-CoA carboxylase subunit α (PCCA) and propionyl-CoA carboxylase subunit β (PCCB). In some embodiments, one or more protein transgenes that are delivered in conjunction with the present invention are a variant of any of the protein transgenes including, but not limited to, a variant of ornithine transcarbamylase (OTC), a variant of glucose 6-phosphatase (G6Pase), a variant of factor VIII, a variant of factor IX, a variant of ATP7B, a variant of phenylalanine hydroxylase (PAH), a variant of argininosuccinate synthetase, a variant of cyclin-dependent kinase-like 5 (CDKL5), a variant of propionyl-CoA carboxylase subunit α (PCCA) and a variant of propionyl-CoA carboxylase subunit β (PCCB).

Vector: A vector is a nucleic acid molecule allowing insertion of foreign nucleic acid without disrupting the ability of the vector to replicate and/or integrate in a host cell. A vector can include nucleic acid sequences that permit it to replicate in a host cell, such as an origin of replication. A vector can also include one or more selectable marker genes and other genetic elements. An expression vector is a vector that contains the necessary regulatory sequences to allow transcription and translation of inserted gene or genes. In some embodiments herein, the vector is an AAV vector.

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. "Comprising A or B" means including A, or B, or A and B. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

This invention provides methods for managing host immune responses to improve therapeutic outcomes in AAV gene therapy. More specifically, provided herein are methods comprising the administration of an rAAV gene therapy product following administration of an inhibitor of CD19. Such methods can be useful in suppressing the development of long-lasting humoral immunity that may otherwise be generated against an rAAV gene therapy product or the expressed transgene. As described herein, methods utilizing inhibitors of CD19 represent an improvement over current approaches that employ anti-CD20 antibodies, such as those being employed in Clinical Trial No. NCT02240407 ("Re-administration of Intramuscular AAV9 in Patients with Late-Onset Pompe Disease (AAV9-GAA_IM)") and Clinical Trial No. NCT02525172 ("Immune Modulation Therapy for Pompe Disease").

Although the mechanisms underlying the maintenance of long-lasting humoral immunity are not well understood, it is well established that antigen-specific antibody responses can last as long as a lifetime (See Amanna et al., 2007, NEJM 357(19): 1903-15 and Crotty et al., 2003, *The Journal of Immunology*, 171: 4969-4973). Upon encountering an antigen, a subject's B cells proliferate and give rise to memory B cells and clonally related plasma cells, with memory B cells giving rise to additional plasma cells upon antigen reencounter. Interestingly, B-cell depletion studies using anti-CD20 antibodies suggest that at least some plasma cells are maintained independent of regeneration from B cells (See Bhoj et al., 2016, *Blood* 12: 360-370 and Owczarczyk et al., 2011, *Science Translational Medicine*, Vol 3 Issue 101, 101ra92). This implies that long-lived humoral immunity may theoretically be maintained by plasma cells and that such plasma cells are not impacted via existing B-cell depletion strategies that employ an anti-CD20 antibody such as rituximab. Accordingly, novel approaches are needed to additionally deplete certain plasma cells that may otherwise prohibit redosing with the same rAAV or an AAV expressing the same or substantially similar protein transgene.

It has been proposed that humoral immunity relies on distinct subsets of plasma cells with complementary functions and different dynamics (See Mei et al., 2015, *Blood* 125: 1739-1748). Recent studies have shown that some long-lived plasma cells in human bone marrow express CD19 and that these plasma cells can be present decades after antigen encounter (See Brynjolfsson et al., 2017, *Blood Adv.* 1: 835-838). Human CD19 is a 95 kilodalton transmembrane glycoprotein belonging to the immunoglobulin (Ig) superfamily. CD19 is classified as a type I transmembrane protein, with a single transmembrane domain, a cytoplasmic C-terminus, and an extracellular N-terminus. CD19 is specifically expressed in normal and neoplastic B cells, as well as follicular dendritic cells. During B cell lymphopoiesis, the surface expression of CD19 begins during immunoglobulin gene rearrangement. The surface density of CD19 is highly regulated throughout B cell development and maturation, until the loss of expression during terminal plasma cell differentiation. Given the expression of CD19 on B cells as well as plasma cells, it can represent as an improved target over CD20.

In a first aspect, the present disclosure provides a method for administering a recombinant adeno-associated virus (rAAV) to a subject, wherein said method comprises first administering a CD19 inhibitor to said subject and thereafter administering the rAAV to said subject.

In one embodiment, the CD19 inhibitor is selected from an anti-CD19 antibody, an anti-CD19 scFv, a CD19 antisense oligonucleotide, a CD19 siRNA, and a small molecule inhibitor of CD19.

In one embodiment, the CD19 inhibitor is an anti-CD19 antibody. In some embodiments, the anti-CD19 antibody may be selected from inebilizumab, tafasitamab, and FMC63.

In one embodiment, the anti-CD19 antibody is inebilizumab, which is described in U.S. Pat. Nos. 8,323,653, 8,883,992, and 9,896,505, the disclosures of which are herein incorporated by reference.

In one embodiment, the anti-CD19 antibody comprises a heavy chain variable region (VH) comprising the amino acid sequence of SEQ ID NO: 1. In one embodiment, the anti-CD19 antibody comprises a light chain variable region (VL) comprising the amino acid sequence of SEQ ID NO: 2. In one embodiment, the anti-CD19 antibody comprises a heavy chain variable region (VH) comprising the amino acid sequence of SEQ ID NO: 1 and a light chain variable region (VL) comprising the amino acid sequence of SEQ ID NO: 2.

In one embodiment, the anti-CD19 antibody comprises a heavy chain variable region (VH) comprising at least one CDR having an amino acid sequence selected from SEQ ID NO: 3, SEQ ID NO: 4, and SEQ ID NO: 5. In one embodiment, the anti-CD19 antibody comprises a light chain variable region (VL) comprising at least one CDR having an amino acid sequence selected from SEQ ID NO: 6, SEQ ID NO: 7, and SEQ ID NO: 8. In one embodiment, the anti-CD19 antibody comprises a heavy chain variable region (VH) comprising at least one CDR having an amino acid sequence selected from SEQ ID NO: 3, SEQ ID NO: 4, and SEQ ID NO: 5 and a light chain variable region (VL) comprising at least one CDR having an amino acid sequence selected from SEQ ID NO: 6, SEQ ID NO: 7, and SEQ ID NO: 8.

In one embodiment, the anti-CD19 antibody comprises a heavy chain variable region (VH) comprising CDRs having amino acid sequences of SEQ ID NO: 3 (CDR1), SEQ ID NO: 4 (CDR2), and SEQ ID NO: 5 (CDR3). In one embodiment, the anti-CD19 antibody comprises a light chain variable region (VL) comprising CDRs having amino acid sequences of SEQ ID NO: 6 (CDR1), SEQ ID NO: 7 (CDR2), and SEQ ID NO: 8 (CDR3). In one embodiment, the anti-CD19 antibody comprises a heavy chain variable region (VH) comprising CDRs having amino acid sequences of SEQ ID NO: 3 (CDR1), SEQ ID NO: 4 (CDR2), and SEQ ID NO: 5 (CDR3) and a light chain variable region (VL) comprising CDRs having amino acid sequences of SEQ ID NO: 6 (CDR1), SEQ ID NO: 7 (CDR2), and SEQ ID NO: 8 (CDR3).

In one embodiment, the anti-CD19 antibody is tafasitamab, which is described in U.S. Pat. Nos. 8,524,867, 9,803,020, and WO/2018/002031, the disclosures of which are herein incorporated by reference.

In one embodiment, the anti-CD19 antibody comprises a heavy chain variable region (VH) comprising the amino acid sequence of SEQ ID NO: 9. In one embodiment, the anti-CD19 antibody comprises a light chain variable region (VL) comprising the amino acid sequence of SEQ ID NO: 10. In one embodiment, the anti-CD19 antibody comprises a heavy chain variable region (VH) comprising the amino acid sequence of SEQ ID NO: 9 and a light chain variable region (VL) comprising the amino acid sequence of SEQ ID NO: 10.

In one embodiment, the anti-CD19 antibody comprises a heavy chain variable region (VH) comprising at least one CDR having an amino acid sequence selected from SEQ ID NO: 11, SEQ ID NO: 12, and SEQ ID NO: 13. In one embodiment, the anti-CD19 antibody comprises a light chain variable region (VL) comprising at least one CDR having an amino acid sequence selected from SEQ ID NO: 14, SEQ ID NO: 15, and SEQ ID NO: 16. In one embodiment, the anti-CD19 antibody comprises a heavy chain variable region (VH) comprising at least one CDR having an amino acid sequence selected from SEQ ID NO: 11, SEQ ID NO: 12, and SEQ ID NO: 13 and a light chain variable region (VL) comprising at least one CDR having an amino acid sequence selected from SEQ ID NO: 14, SEQ ID NO: 15, and SEQ ID NO: 16.

In one embodiment, the anti-CD19 antibody comprises a heavy chain variable region (VH) comprising CDRs having amino acid sequences of SEQ ID NO: 11 (CDR1), SEQ ID NO: 12 (CDR2), and SEQ ID NO: 13 (CDR3). In one embodiment, the anti-CD19 antibody comprises a light chain variable region (VL) comprising CDRs having amino acid sequences of SEQ ID NO: 14 (CDR1), SEQ ID NO: 15 (CDR2), and SEQ ID NO: 16 (CDR3). In one embodiment, the anti-CD19 antibody comprises a heavy chain variable region (VH) comprising CDRs having amino acid sequences of SEQ ID NO: 11 (CDR1), SEQ ID NO: 12 (CDR2), and SEQ ID NO: 13 (CDR3) and a light chain variable region (VL) comprising CDRs having amino acid sequences of SEQ ID NO: 14 (CDR1), SEQ ID NO: 15 (CDR2), and SEQ ID NO: 16 (CDR3).

In some embodiments, the anti-CD19 antibody may be selected from an anti-CD19 antibody described in any of the following references: WO/2005/012493 (Immunomedics, Inc.), WO/2006/089133 (Duke University), WO/2007/002223 (Medarex, Inc.), WO/2007/076950 (Merck Patent Gmbh), WO/2007/082715 (Friedrich-Alexander-Universitat Erlangen-Nurnberg), WO/2008/022152 (Xencor, Inc.), WO/2008/031056 (Medimmune, LLC), WO/2009/052431 (Seattle Genetics, Inc.), WO/2009/054863 (Medarex, Inc.), WO/2010/053716 (Immunomedics, Inc.), WO/2010/095031 (Glenmark Pharmaceuticals S.A.), WO/2010/102276 (Medimmune, LLC), WO/2011/147834 (Roche Glycart AG), WO/2012/010561 (Universite Claude Bernard Lyon), WO/2012/057765 (The Board of Regents of the University of Texas System), WO/2016/033570 (Juno Therapeutics, Inc.), WO/2017/015783 (Innovative Cellular Therapeutics Co., Ltd.), WO/2017/055328 (F. Hoffmann-La Roche AG), WO/2017/066136 (Eureka Therapeutics, Inc.), WO/2018/002031 (Morphosys AG), WO/2018/108106 (Carsgen Theraeputics, Ltd.), WO/2018/126369 (Shanghai Sidansai Biotechnology Co., Ltd.), and WO/2019/057100 (Wuxi Biologics Co., Ltd.), the disclosures of which are herein incorporated by reference.

In some embodiments, the anti-CD19 antibody mediates antigen-dependent cell-mediated cytotoxicity (ADCC) of cells expressing CD19. In some embodiments, the anti-CD19 antibody mediates complement-dependent cell-mediated cytotoxicity (CDC) of cells expressing CD19. In some embodiments, the anti-CD19 antibody mediates apoptosis of cells expressing CD19. In some embodiments, the anti-CD19 antibody inhibits IgM/CpG stimulated B cell proliferation.

In one embodiment, the anti-CD19 antibody, following administration, may deplete circulating B cells, blood B cells, splenic B cells, marginal zone B cells, follicular B cells, peritoneal B cells, and/or bone marrow B cells.

In one embodiment, the anti-CD19 antibody, following administration, may deplete progenitor B cells, early pro-B cells, late pro-B cells, large-pre-B cells, small pre-B cells, immature B cells, mature B cells, antigen stimulated B cells, and/or plasma cells.

In one embodiment, the anti-CD19 antibody, following administration, may deplete B cells in a human subject. In a specific embodiment, an anti-CD19 antibody administered according to the present invention may achieve at least about 20%, at least about 30%, at least about 40%, at least about 50%, at least about 60%, at least about 70%, at least about 80%, at least about 90%, at least about 95%, or about 100% B cell depletion. In another embodiment, the anti-CD19 antibody, following administration, may deplete B cell subsets in a human subject. In a specific embodiment, the anti-CD19 antibody, following administration, may deplete circulating B cells, blood B cells, splenic B cells, marginal zone B cells, follicular B cells, peritoneal B cells, and/or bone marrow B cells. CD19 is present on the surface of B cells at all developmental stages. An anti-CD19 antibody, following administration, may therefore deplete B cells of all developmental stages. In a specific embodiment, the anti-CD19 antibody, following administration, may achieve depletion of progenitor B cells, early pro-B cells, late pro-B cells, large-pre-B cells, small pre-B cells, immature B cells, mature B cells, antigen stimulated B cells, and/or plasma cells. Depletion of B cells may persist for extended periods of time. In one embodiment, B cell depletion by an anti-CD19 antibody administered according to the invention may persist for at least 1 day, at least 2 days, at least 3 days, at least 4 days, at least 5 days at least 6 days, at least 7 days, at least 8 days, at least 9 days, at least 10 days, at least 15 days, at least 20 days, at least 25 days, or at least 30 days. In another embodiment, B cell depletion by an anti-CD19 antibody administered according to the invention may persist for at least 1 week, at least 2 weeks, at least 3 weeks, at least 4 weeks, at least 5 weeks, at least 6 weeks, at least 7 weeks, at least 8 weeks, at least 9 weeks, or at least 10 weeks. In a further embodiment, B cell depletion by an anti-CD19 antibody administered according to the invention may persist for at least 1 month, at least 2 months, at least 3 months, at least 4 months, at least 5 months, at least 6 months, at least 7 months, at least 8 months, at least 9 months, at least 10 months, at least 11 months or at least 12 months.

In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of circulating B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of blood B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of splenic B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of marginal zone B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of follicular B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of peritoneal B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of bone marrow B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of progenitor B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of early pro-B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of late pro-B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of large pre-B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of small pre-B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of immature B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of mature B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of antigen stimulated B cells. In one embodiment, the anti-CD19 antibody, following administration, depletes at least about 20%, at least about 30%, at least about 40%, at least about 50%, at least about 60%, at least about 70%, at least about 80%, at least about 90%, at least about 95%, or about 100% of plasma cells. Depletion of B cells and/or plasma cells may persist for extended periods of time. In one embodiment, B cell depletion and/or plasma cell depletion by an anti-CD19 antibody may persist for at least 1 day, at least 2 days, at least 3 days, at least 4 days, at least 5 days at least 6 days, at least 7 days, at least 8 days, at least 9 days, at least 10 days, at least 15 days, at least 20 days, at least 25 days, or at least 30 days. In another embodiment, B cell depletion and/or plasma cell depletion by an anti-CD19 antibody may persist for at least 1 week, at least 2 weeks, at least 3 weeks, at least 4 weeks, at least 5 weeks, at least 6 weeks, at least 7 weeks, at least 8 weeks, at least 9 weeks, or at least 10 weeks. In a further embodiment, B cell depletion and/or plasma cell depletion by an anti-CD19 antibody may persist for at least 1 month, at least 2 months, at least 3 months, at least 4 months, at least 5 months, at least 6 months, at least 7 months, at least 8 months, at least 9 months, at least 10 months, at least 11 months, or at least 12 months.

In one embodiment, the CD19 inhibitor is administered to the subject at least about 12 hours before administration of the rAAV. In another embodiment, the CD19 inhibitor is administered to the subject at least about 24 hours before administration of the rAAV. In yet another embodiment, the CD19 inhibitor is administered to the subject at least about 2 days before administration of the rAAV. In yet another embodiment, the CD19 inhibitor is administered to the subject at least about 3, 4, 5, 6, 7, or more days before administration of the rAAV. In yet another embodiment, the CD19 inhibitor is administered to the subject at least about 7, 14, 21, or more days before administration of the rAAV. In yet another embodiment, the CD19 inhibitor is administered to the subject at least about 1 month, at least about 2 months, or at least about 3 months before administration of the rAAV.

In one embodiment, the CD19 inhibitor is administered once before administration of the rAAV. In another embodiment, the CD19 inhibitor is administered twice before administration of the rAAV. In yet another embodiment, the CD19 inhibitor is administered 3, 4, 5, or more times before administration of the rAAV.

Administration of the CD19 inhibitor to a human subject can be by any route, including but not limited to intravenous, intradermal, transdermal, subcutaneous, intramuscular, inhalation (e.g., via an aerosol), buccal (e.g., sub-lingual), topical (i.e., both skin and mucosal surfaces, including airway surfaces), intrathecal, intraarticular, intraplural, intracerebral, intra-arterial, intraperitoneal, oral, intralymphatic, intranasal, rectal, or vaginal administration, by perfusion through a regional catheter, or by direct intralesional injection. In one embodiment, a CD19 inhibitor is administered by intravenous push or intravenous infusion given over defined period (e.g., 0.5 to 2 hours). CD19 inhibitors can be delivered by peristaltic means or in the form of a depot, although the most suitable route in any given case will depend, as is well known in the art, on such factors as the species, age, gender, and overall condition of the subject, the nature and severity of the condition being treated, and/or on the nature of the particular composition (i.e., dosage, formulation) that is being administered. In some embodiments, the route of administration is via bolus or continuous infusion over a period of time.

In certain embodiments, the CD19 inhibitor is administered subcutaneously, intramuscularly, intradermally, intraperitoneally, or intravenously. In an exemplary embodiment, the CD19 inhibitor is administered intravenously.

In certain embodiments, the dose of a composition comprising a CD19 inhibitor, e.g. an anti-CD19 antibody, is measured in units of mg/kg of subject body weight. In other embodiments, the dose of a composition comprising a CD19 inhibitor, e.g. an anti-CD19 antibody, is measured in units of mg per dose administered to a subject. Any measurement of dose can be used in conjunction with compositions and methods of the invention and dosage units can be converted by means standard in the art.

In certain embodiments wherein the CD19 inhibitor is an anti-CD19 antibody, the anti-CD19 antibody may be administered at a dose of about 10 mg to about 3000 mg. In some embodiments, the anti-CD19 antibody is be administered at a dose of about 50 mg to about 2000 mg. In some embodiments, the anti-CD19 antibody is be administered at a dose of about 100 mg to about 1000 mg. In some embodiments, the anti-CD19 antibody is be administered at a dose of about 200 mg to about 500 mg. In some embodiments, the anti-CD19 antibody is administered at a dose of about 250 mg to about 350 mg. In an exemplary embodiment, the anti-CD19 antibody is administered at a dose of about 300 mg.

In certain embodiments wherein the CD19 inhibitor is an anti-CD19 antibody, the anti-CD19 antibody may be administered at a dose of about 10 mg, about 20 mg, about 30 mg, about 40 mg, about 50 mg, about 60 mg, about 70 mg, about 80 mg, about 90 mg, about 100 mg, about 110 mg, about 120 mg, about 130 mg, about 140 mg, about 150 mg, about 160 mg, about 170 mg, about 180 mg, about 190 mg, about 200 mg, about 210 mg, about 220 mg, about 230 mg, about 240 mg, about 250 mg, about 260 mg, about 270 mg, about 280 mg, about 290 mg, about 300 mg, about 310 mg, about 320 mg, about 330 mg, about 340 mg, about 350 mg, about 360 mg, about 370 mg, about 380 mg, about 390 mg, about 400 mg, about 410 mg, about 420 mg, about 430 mg, about 440 mg, about 450 mg, about 460 mg, about 470 mg, about 480 mg, about 490 mg, about 500 mg, about 510 mg, about 520 mg, about 530 mg, about 540 mg, about 550 mg, about 560 mg, about 570 mg, about 580 mg, about 590 mg, about 600 mg, about 650 mg, about 700 mg, about 750 mg, about 800 mg, about 850 mg, about 900 mg, about 950 mg, about 1000 mg, about 1100 mg, about 1200 mg, about 1300 mg, about 1400 mg, about 1500 mg, about 2000 mg, about 2500 mg, or about 3000 mg.

In certain embodiments wherein the CD19 inhibitor is an anti-CD19 antibody, the anti-CD19 antibody may be administered at a dose of about 0.1 mg/kg to about 50 mg/kg of body weight of a subject. In some embodiments, the anti-CD19 antibody is administered at a dose of about 1 mg/kg to about 10 mg/kg. In some embodiments, the anti-CD19 antibody is administered at a dose of about 2 mg/kg to about 8 mg/kg. In some embodiments, the anti-CD19 antibody is administered at a dose of about 2 mg/kg, about 2.5 mg/kg, about 3 mg/kg, about 3.5 mg/kg, about 4 mg/kg, about 4.5 mg/kg, about 5 mg/kg, about 5.5 mg/kg, about 6 mg/kg, about 6.5 mg/kg, about 7 mg/kg, about 7.5 mg/kg, or about 8 mg/kg.

In certain embodiments wherein the CD19 inhibitor is an anti-CD19 antibody, the anti-CD19 antibody may be administered at a dose of at least about 0.1 mg/kg, at least about 0.2 mg/kg, at least about 0.3 mg/kg, at least about 0.4 mg/kg, at least about 0.5 mg/kg, at least about 0.6 mg/kg, at least about 0.7 mg/kg, at least about 0.8 mg/kg, at least about 0.9 mg/kg, at least about 1 mg/kg, at least about 1.5 mg/kg, at least about 2 mg/kg, at least about 2.5 mg/kg, at least about 3 mg/kg, at least about 3.5 mg/kg, at least about 4 mg/kg, at least about 4.5 mg/kg, at least about 5 mg/kg, at least about 5.5 mg/kg, at least about 6 mg/kg, at least about 6.5 mg/kg, at least about 7 mg/kg, at least about 7.5 mg/kg, at least about 8 mg/kg, at least about 8.5 mg/kg, at least about 9 mg/kg, at least about 9.5 mg/kg, at least about 10 mg/kg, at least about 10.5 mg/kg, at least about 11 mg/kg, at least about 11.5 mg/kg, at least about 12 mg/kg, at least about 12.5 mg/kg, at least about 13 mg/kg, at least about 13.5 mg/kg, at least about 14 mg/kg, at least about 14.5 mg/kg, at least about 15 mg/kg, at least about 15.5 mg/kg, at least about 16 mg/kg, at least about 16.5 mg/kg, at least about 17 mg/kg, at least about 17.5 mg/kg, at least about 18 mg/kg, at least about 18.5 mg/kg, at least about 19 mg/kg, at least about 19.5 mg/kg, at least about 20 mg/kg, at least about 25 mg/kg, at least about 30 mg/kg, at least about 35 mg/kg, at least about 40 mg/kg, at least about 45 mg/kg, or at least about 50 mg/kg of body weight of a subject.

In certain embodiments where the CD19 inhibitor is an anti-CD19 antibody, the anti-CD19 antibody may formulated in a pharmaceutical composition that comprises the anti-CD19 antibody and a pharmaceutically acceptable carrier or excipient. In some embodiments, the pharmaceutical composition is formulated for subcutaneous, intramuscular, intradermal, intraperitoneal, or intravenous administration. In an exemplary embodiment, the pharmaceutical composition is formulated for intravenous administration.

In some embodiments, the method for administering a recombinant adeno-associated virus (rAAV) to a subject may further comprise the administration of intravenous immune globulin (IVIg) before, simultaneous with, or after administration of the CD19 inhibitor. In some embodiments, the CD19 inhibitor and the IVIg may be administered simultaneously. In some embodiments, the CD19 inhibitor and the IVIg may be administered sequentially. In some embodiments, the CD19 inhibitor and the IVIg may be administered separately.

In some embodiments, the IVIg may be selected from Bivigam, Clairyg, Flebogam, Flebogammadit, Gammagard Liquid 10%, Gammaplex, Gammunex, IG Vena, Intratecth, Kiovig, Nanogam, Octagam, Octagam 10%, Polyglobin N10%, Sandoglobulin NF liquid, and Vi gam. In an exemplary embodiment, the IVIg is Gammagard Liquid 10% (Baxter Healthcare International), which is a sterile, liquid preparation of highly purified and concentrated immunoglobulin G (IgG) antibodies. A non-limiting listing of commercially available immunoglobulin formulations which can be used in methods of the present disclosure as IVIg is provided in U.S. 2017/0021114, the disclosure of which are herein incorporated by reference.

In some embodiments, the method for administering a recombinant adeno-associated virus (rAAV) to a subject may further comprise the administration of a corticosteroid before, simultaneous with, or after administration of the CD19 inhibitor. In some embodiments, the CD19 inhibitor and the corticosteroid may be administered simultaneously. In some embodiments, the CD19 inhibitor and the corticosteroid may be administered sequentially. In some embodiments, the CD19 inhibitor and the corticosteroid may be administered separately.

In some embodiments, the corticosteroid is selected from prednisolone, dexamethasone, hydrocortisone, methylprednisolone, betamethasone, cortisone, prednisone, budesonide, and triamcinolone. In certain exemplary embodiments, the corticosteroid is prednisolone.

In some embodiments, the corticosteroid is administered at a dose of about 10 mg per day to about 100 mg per day. In some embodiments, the corticosteroid is administered at a dose of about 20 mg per day to about 80 mg per day. In some embodiments, the corticosteroid is administered at a dose of about 30 mg per day to about 70 mg per day. In certain exemplary embodiments, the corticosteroid is administered at a dose of about 60 mg per day.

In some embodiments, the corticosteroid is administered at a dose of about 5 mg, about 10 mg, about 15 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, about 105 mg, about 110 mg, about 115 mg, about 120 mg, about 125 mg, about 150 mg, about 175 mg, about 200 mg, about 250 mg, about 300 mg, about 350 mg, about 400 mg, about 450 mg, or about 500 mg.

In some embodiments, the corticosteroid may be administered at a dose of about 0.1 mg/kg/day to about 10 mg/kg/day of body weight of a subject. In some embodiments, the corticosteroid is administered at a dose of about 0.5 mg/kg/day to about 5 mg/kg/day. In some embodiments, the corticosteroid is administered at a dose of about 0.1, about 0.2, about 0.3, about 0.4, about 0.5, about 0.6, about 0.7, about 0.8, about 0.9, about 1, about 1.1, about 1.2, about 1.3, about 1.4, about 1.5, about 2.0, about 2.5, about 3.0, about 3.5, about 4.0, about 4.5, or about 5 mg/kg/day.

In some embodiments, the corticosteroid may be administered for a total of at least 1, 2, 3, 4, 5, 6, 7, 8, 9, 10, or more days prior to administration of the rAAV. For example, in certain exemplary embodiments, the corticosteroid may be administered at 60 mg per day for 5 days prior to administration of the rAAV.

In some embodiments, the corticosteroid may be administered at 60 mg per day for 4 weeks with a first dose occurring 5 days prior to administration of the rAAV. In some embodiments, the corticosteroid may be administered at 60 mg per day for 4 weeks with a first dose occurring 5 days prior to administration of the rAAV, followed by a taper of corticosteroid for an additional 4 weeks.

In some embodiments, the method for administering a recombinant adeno-associated virus (rAAV) to a subject may further comprise the administration of an agent selected from a proteasome inhibitor (e.g., bortezomib, carfilzomib, ixazomib, oprozomib, delanzomib, or marizomib), a toll-like receptor (TLR) antagonist (e.g., a TLR7 antagonist or a TLR9 antagonist such as chloroquine, hydroxychloroquine, or quinacrine, AT791 or E6446 (see Lamphier et al., 2014, Mol Pharmacol., 85(3):429-40)), an immunosuppressive macrocycle (e.g., sirolimus, cyclosporin A, tacrolimus, or rapamycin analogues such as everolimus, biolimus, and temsirolimus), an antimetabolite (e.g., azathioprine, mercaptopurine, thiopurine, or methotrexate), a cyclic guanosine monophosphate (GMP)-adenosine monophosphate (AMP) synthase-stimulator of interferon genes (cGAS-STING) antagonist, interleukin-2 (IL-2), an IL-2 mutein (e.g., AMG 592, NKTR-358, or DEL106), an anti-CD38 antibody (e.g., daratumumab, isatuximab, MOR202, or TAK-079), an immunomodulatory drug (IMiD) (e.g., lenalidomide, pomalidomide, or apremilast), an anti-B-cell maturation antigen (BCMA) agent (e.g., chimeric antigen receptor T-cells (CAR-T) (e.g., CT053 or bb2121), antibody-drug conjugate (ADC) (e.g., GSK2857916), bispecific T cell engager (BiTE), or an anti-BCMA antibody), an anti-SLAM family member 7 (SLAMF7) antibody (e.g., elotuzumab), a mammalian target of rapamycin (mTOR) inhibitor (e.g., ABI-009 nab-rapamycin), synthetic vaccine particles encapsulating rapamycin (SVP-R), the combination of SVP-R and pegylated uricase (pegadricase) (e.g., SEL-212), cyclophosphamide, mycophenolate mofetil, a phosphoinositide 3-kinase inhibitor (e.g., idelalisib, copanlisib, duvelisib, or alpelisib), a Bruton's tyrosine kinase inhibitor (e.g., ibrutinib, zanubrutinib, acalabrutinib, evobrutinib, HM71224, BGB-3111, spebrutinib, or ONO-4059), a sphingosine-1-phosphate receptor modulator (e.g., fingolimod or ozanimod), an anti-B-cell activating factor (BAFF or also known as tumor necrosis factor ligand superfamily member 13B) inhibitor (e.g., belimumab, atacicept, or blisibimod), or an IgG-degrading protease (e.g., IdeS of *Streptococcus pyogenes*, an engineered IdeS variant, IdeZ of *Streptococcus equi*, or IgdE enzymes from *Streptococcus suis, Streptococcus porcinus*, or *Streptococcus equi*). In some embodiments, the agent may be administered before, simultaneous with, or after administration of the CD19 inhibitor. In some embodiments, the CD19 inhibitor and the agent may be administered simultaneously. In some embodiments, the CD19 inhibitor and the agent may be administered sequentially. In some embodiments, the CD19 inhibitor and the agent may be administered separately.

In some embodiments, the agent is a proteasome inhibitor. In some embodiments, the proteasome inhibitor is selected from bortezomib, carfilzomib, ixazomib, oprozomib, delanzomib, or marizomib. In an exemplary embodiment, the proteasome inhibitor is bortezomib. Accordingly, in some embodiments, this disclosure provides a method for administering a recombinant adeno-associated virus (rAAV) to a subject, wherein said method comprises first administering a CD19 inhibitor and a proteasome inhibitor to said subject and thereafter administering the rAAV to said subject. In some embodiments, the CD19 inhibitor is inebilizumab and the proteasome inhibitor is bortezomib. Thus, in some embodiments, the instant disclosure provides a method of administering an rAAV following administration of an anti-CD19 antibody such as inebilizumab and a proteasome inhibitor such as bortezomib.

In some embodiments, the agent is an IgG-degrading protease. Examples of proteases that may be used in the instant invention include, for example and without limitation, those described in WO/2020/016318 and/or WO/2020/159970, including, for example, cysteine proteases from *Streptococcus pyogenes, Streptococcus equi, Mycoplasma canis, Streptococcus agalactiae, Streptococcus pseudoporcinus*, or *Pseudomonas putida*.

In certain embodiments, the IgG-degrading protease is the IdeS from *Streptococcus pyogenes* (SEQ ID NO: 20) or a protease which is at least 80%, at least 85%, at least 90%, at least 95%, at least 96%, at least 97%, at least 98%, or at least 99% identical to SEQ ID NO: 20. In some embodiments, the protease is an engineered variant of SEQ ID NO: 20. Examples of engineered IdeS proteases are described in WO/2020/016318 and U.S. Patent Publication Nos. 20180023070 and 20180037962. In some embodiments, the engineered IdeS variant may have 1, 2, 3, 4, 5, or more amino acid modifications relative to SEQ ID NO: 20.

In certain embodiments, the IgG-degrading protease is the IdeZ from *Streptococcus equi* (SEQ ID NO: 21) or a protease which is at least 80%, at least 85%, at least 90%, at least 95%, at least 96%, at least 97%, at least 98%, or at least 99% identical to SEQ ID NO: 21. In some embodiments, the protease is an engineered variant of SEQ ID NO: 21. Examples of engineered IdeZ proteases are described in WO/2020/016318. In some embodiments, the engineered IdeZ variant may have 1, 2, 3, 4, 5, or more amino acid modifications relative to SEQ ID NO: 21.

Other proteases that may be used in the instant invention include, for example and without limitation, IgdE enzymes from *Streptococcus suis, Streptococcus porcinus*, and *Streptococcus equi*, described in WO/2017/134274.

In some embodiments, the IgG-degrading protease may be encapsulated in or complexed with liposomes, nanoparticles, lipid nanoparticles (LNPs), polymers, microparticles, microcapsules, micelles, or extracellular vesicles.

In some embodiments, the recombinant adeno-associated virus (rAAV) administered according to a method of the present disclosure comprises an AAV capsid and a vector genome packaged therein.

In some embodiments, the packaged vector genome comprises an AAV 5' inverted terminal repeat sequence (ITR), a promoter sequence, a partial or complete coding sequence for a protein transgene or a functional fragment, functional variant or isoform thereof, and an AAV 3' inverted terminal repeat sequence (ITR).

In some embodiments, the packaged genome may further comprise an enhancer, an intron, a consensus Kozak sequence, and/or a polyadenylation signal. In some embodiments, the recombinant vector can further include one or more stuffer nucleic acid sequences. In one embodiment, a stuffer nucleic acid sequence is situated between the intron and the partial or complete coding sequence for a protein transgene.

In various embodiments described herein, the rAAV comprises an AAV capsid. AAV capsids of any serotype may be used in the present invention, and the selection of AAV serotype will depend in part on the cell type(s) that are targeted for gene therapy. The AAV capsid can be from an AAV of serotype 1, 2, 3, 4, 5, 6, 7, 8, 9, 10, 11, 12, rh10, hu37 (i.e., AAV1, AAV2, AAV3, AAV4, AAV5, AAV6, AAV7, AAV8, AAV9, AAV10, AAV11, AAV12, AAVrh10, AAVhu37), as well as any one of the more than 100 variants isolated from human and nonhuman primate tissues (See, e.g., Choi et al., 2005, *Curr Gene Ther.* 5: 299-310, 2005 and Gao et al., 2005, *Curr Gene Ther.* 5: 285-297).

Beyond the aforementioned capsids, also included within the scope of the present disclosure are variant AAV capsids which have been engineered to harbor one or more beneficial therapeutic properties (e.g., improved targeting for select tissues, increased ability to evade the immune response, reduced stimulation of neutralizing antibodies, etc.). Non-limiting examples of such engineered variant capsids are described in U.S. Pat. Nos. 9,506,083, 9,585,971, 9,587,282, 9,611,302, 9,725,485, 9,856,539, 9,909,142, 9,920,097, 10,011,640, 10,081,659, 10,179,176, 10,202,657, 10,214,566, 10,214,785, 10,266,845, 10,294,281, 10,301,648, 10,385,320, and 10,392,632 and in PCT Publication Nos. WO/2017/165859, WO/2018/022905, WO/2018/156654, WO/2018/222503, and WO/2018/226602, the disclosures of which are herein incorporated by reference.

In certain exemplary embodiments, the rAAV administered according to the present disclosure comprises an AAV9 capsid. The AAV9 capsid is a self-assembled AAV capsid composed of multiple AAV9 vp proteins. The AAV9 vp proteins are typically expressed as alternative splice variants encoded by a nucleic acid sequence of SEQ ID NO: 18 or a sequence that is at least 70%, at least 75%, at least 80%, at least 85%, at least 90%, at least 95%, at least 97%, at least 99% thereto, which encodes the vp1 amino acid sequence of SEQ ID NO: 19 (GenBank Accession: AAS99264). These splice variants result in proteins of different length of SEQ ID NO: 19. In certain embodiments, an AAV9 capsid includes an AAV having an amino acid sequence which is 99% identical to AAS99264 or 99% identical to SEQ ID NO: 19. See also U.S. Pat. No. 7,906,111, and WO/2005/

033321. As used herein, an AAV9 variant includes those described in, e.g., WO/2016/049230, U.S. Pat. No. 8,927, 514, U.S. Patent Publication No. 2015/0344911, and U.S. Pat. No. 8,734,809.

As indicated herein, the rAAV administered according to the invention may comprise, in some embodiments, an AAV9 capsid. However, in other embodiments, another AAV capsid is selected. Tissue specificity is determined by the capsid type. AAV serotypes which transduce a suitable target (e.g., liver, muscle, lung, or CNS) may be selected as sources for capsids of AAV viral vectors including, e.g., AAV1, AAV2, AAV3, AAV4, AAV5, AAV6, AAV6.2, AAV7, AAV8, AAV9, AAVrh10, AAVrh64R1, AAVrh64R2, AAVrh8, See. e.g., U.S. Patent Publication No. 2007/0036760; U.S. Patent Publication No. 2009/0197338; and EP1310571. See also WO 2003/042397 (AAV7 and other simian AAV), U.S. Pat. Nos. 7,282,199 and 7,790,449 (AAV8). In addition, AAV yet to be discovered, or a recombinant AAV based thereon, may be used as a source for the AAV capsid. These documents also describe other AAV which may be selected for generating AAV and are incorporated by reference. In some embodiments, an AAV capsid for use in the viral vector can be generated by mutagenesis (i.e., by insertions, deletions, or substitutions) of one of the aforementioned AAV capsids or its encoding nucleic acid. In some embodiments, the AAV capsid is chimeric, comprising domains from two or three or four or more of the aforementioned AAV capsid proteins. In some embodiments, the AAV capsid is a mosaic of Vp1, Vp2, and Vp3 monomers from two or three different AAVs or recombinant AAVs. In some embodiments, an rAAV composition comprises more than one of the aforementioned capsids In some embodiments, the rAAV comprises a packaged vector genome which comprises an AAV ITR sequence, which functions as both the origin of vector DNA replication and the packaging signal of the vector genome, when AAV and adenovirus helper functions are provided in trans. Additionally, the ITRs serve as the target for single-stranded endonucleatic nicking by the large Rep proteins, resolving individual genomes from replication intermediates.

In some embodiments, the 5'-ITR sequence is from AAV2. In some embodiments, the 3'-ITR sequence is from AAV2. In some embodiments, the 5'-ITR sequence and the 3'-ITR sequence are from AAV2. In some embodiments, the 5'-ITR sequence and/or the 3'-ITR sequence are from AAV2 and comprise or consist of SEQ ID NO: 17. In other embodiments, the 5'-ITR sequence and/or the 3'-ITR sequence are from a non-AAV2 source.

In various aspects described herein, rAAV used in the methods disclosed herein may contain a packaged genome which comprises a promoter sequence which helps drive and regulate transgene expression, e.g., expression of a protein transgene. In exemplary embodiments, the promoter sequence is located between the selected 5' ITR sequence and the partial or complete coding sequence for the protein transgene. In some embodiments, the promoter sequence is located downstream of an enhancer sequence. In some embodiments, the promoter sequence is located upstream of an intron sequence.

In some embodiments, the promoter is selected from a chicken β-actin (CBA) promoter, a cytomegalovirus immediate early gene (CMV) promoter, a transthyretin (TTR) promoter, a thyroxine binding globulin (TBG) promoter, an alpha-1 anti-trypsin (A1AT) promoter, and a CAG promoter.

In addition to a promoter, a vector may contain other appropriate transcription initiation, termination, enhancer sequence, and efficient RNA processing signals. Such sequences include splicing and polyadenylation (poly A) signals, regulatory elements that enhance expression (i.e., WPRE), sequences that stabilize cytoplasmic mRNA, sequences that enhance translation efficiency (i.e., the Kozak consensus sequence), and sequences that enhance protein stability.

In various aspects described herein, rAAV used in the methods disclosed herein may contain a packaged genome that comprises an AAV 5' inverted terminal repeat sequence (ITR), a promoter sequence, a partial or complete coding sequence for a protein transgene or a functional fragment, functional variant or isoform thereof, and an AAV 3' inverted terminal repeat sequence (ITR).

In one embodiment, the partial or complete coding sequence for the protein transgene is a wild-type coding sequence. As used herein, the term "wild-type" refers to a biopolymer (e.g., a polypeptide sequence or polynucleotide sequence) that is the same as the biopolymer (e.g., polypeptide sequence or polynucleotide sequence) that exists in nature.

In an alternative embodiment, the partial or complete coding sequence for the protein transgene is a codon-optimized coding sequence. In one embodiment, the partial or complete coding sequence for the protein transgene is codon-optimized for expression in humans.

In various embodiments described herein, rAAV are provided that contain a packaged genome that comprises a coding sequence for a protein transgene. The polypeptides delivered with the rAAV described herein encompass polypeptides that may be useful in the treatment of mammals, including humans. Such polypeptides include, but are not limited to, ornithine transcarbamylase (OTC), glucose 6-phosphatase (G6Pase), factor VIII, factor IX, ATP7B, phenylalanine hydroxylase (PAH), argininosuccinate synthetase, cyclin-dependent kinase-like 5 (CDKL5), propionyl-CoA carboxylase subunit a (PCCA) and propionyl-CoA carboxylase subunit (PCCB), survival motor neuron (SMN), iduronate-2-sulfatase (IDS), alpha-1-iduronidase (IDUA), tripeptidyl peptidase 1 (TPP1), low-density lipoprotein receptor (LDLR), myotubularin 1, acid alpha-glucosidase (GAA), dystrophia myotonica-protein kinase (DMPK), N-sulfoglucosamine sulfohydrolase (SGSH), fibroblast growth factor-4 (FGF-4), rab escort protein 1 (REP1), carbamoyl synthetase 1 (CPS1), argininosuccinate lyase (ASL), arginase, fumarylacetate hydrolase, alpha-1 antitrypsin, methyl malonyl CoA mutase, a cystic fibrosis transmembrane conductance regulator (CFTR) protein, and a dystrophin gene product (e.g., a minidystrophin or microdystrophin). A non-limiting list of suitable transgenes is found in WO/2019/168961, the disclosure of which is herein incorporated by reference.

In some embodiments, the invention may be used to deliver fragments of the aforementioned transgene proteins which comprise at least 50, at least 100, at least 150, at least 200, at least 250, at least 300, at least 350, at least 400, at least 450, at least 500, at least 550, or at least 600 amino acid residues and retain one or more activities associated with the full-length polypeptide (e.g., catalytic activity in the case of an enzyme). Such fragments may be obtained by recombinant techniques that are routine and well-known in the art. Moreover, such fragments may be tested for catalytic activity by routine in vitro assays known to the skilled artisan.

In some embodiments, the invention may be used to deliver variants of the aforementioned transgene proteins. In some embodiments, the variant proteins may be at least 80% (e.g., 80%, 81%, 82%, 83%, 84%, 85%, 86%, 87%, 88%, 89%, 90%, 91%, 92%, 93%, 94%, 95%, 96%, 97%, 98%, 99%, 99.5%, 99.6%, 99.7%, 99.8%, 99.9%, or 100%) identical to the wild-type therapeutic protein. In some embodiments, the variant transgene proteins may have at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, or at least 40 different residues as compared to the respective wild-type protein. Such variants may be obtained by recombinant techniques that are routine and well-known in the art. Moreover, such variants may be tested for catalytic activity by routine in vitro assays known to the skilled artisan.

In some embodiments, the rAAV to be administered according to the methods of the present disclosure may be formulated as a pharmaceutical composition that comprises the rAAV and a pharmaceutically acceptable carrier or excipient. Suitable pharmaceutical formulations for administration of rAAV can be found, for example, in U.S. Patent Application Publication No. 2012/0219528. The pharmaceutically acceptable carriers (vehicles) useful in this disclosure are conventional. *Remington's Pharmaceutical Sciences*, by E. W. Martin, Mack Publishing Co., Easton, Pa., 15th Edition (1975), describes compositions and formulations suitable for pharmaceutical delivery of one or more therapeutic compounds, molecules or agents. In some embodiments, the pharmaceutical composition comprising an rAAV is formulated for subcutaneous, intramuscular, intradermal, intraperitoneal, intrathecal, intracerebroventricular, or intravenous administration. In an exemplary embodiment, the pharmaceutical composition is formulated for intravenous administration.

In some embodiments, the rAAV is formulated in a buffer/carrier suitable for infusion in human subjects. The buffer/carrier should include a component that prevents the rAAV from sticking to the infusion tubing but does not interfere with the rAAV binding activity in vivo. Various suitable solutions may include one or more of: a buffering saline, a surfactant, and a physiologically compatible salt or mixture of salts adjusted to an ionic strength equivalent to about 100 mM sodium chloride (NaCl) to about 250 mM sodium chloride, or a physiologically compatible salt adjusted to an equivalent ionic concentration. The pH may be in the range of 6.5 to 8.5, or 7 to 8.5, or 7.5 to 8. A suitable surfactant, or combination of surfactants, may be selected from among Poloxamers, i.e., nonionic triblock copolymers composed of a central hydrophobic chain of polyoxypropylene 10 (poly(propylene oxide)) flanked by two hydrophilic chains of polyoxyethylene (poly(ethylene oxide)), SOLUTOL HS 15 (Macrogol-15 Hydroxystearate), LABRASOL (Polyoxy capryllic glyceride), polyoxy 10 oleyl ether, TWEEN (polyoxyethylene sorbitan fatty acid esters), ethanol and polyethylene glycol.

In some embodiments, viral particles (e.g., recombinant AAV) may be encapsulated in or complexed with liposomes, nanoparticles, lipid nanoparticles (LNPs), polymers, microparticles, microcapsules, micelles, or extracellular vesicles.

In yet another aspect, the disclosure provides a method for administering a nucleic acid (e.g., DNA, siRNA, or mRNA) to a subject, wherein said method comprises first administering a CD19 inhibitor to said subject and thereafter administering the nucleic acid (e.g., DNA, siRNA, or mRNA) to said subject. In an exemplary embodiment, the nucleic acid is an mRNA encoding a protein. Any therapeutic protein of interest (e.g., a human wild-type protein) is suitable for use in the methods described herein. An exemplary listing of human proteins can be found in WO/2020/118239. In specific embodiments, the protein is selected from ornithine transcarbamylase (OTC), glucose 6-phosphatase (G6Pase), factor VIII, factor IX, ATP7B, phenylalanine hydroxylase (PAH), argininosuccinate synthetase, cyclin-dependent kinase-like 5 (CDKL5), propionyl-CoA carboxylase subunit α (PCCA) and propionyl-CoA carboxylase subunit (PCCB), survival motor neuron (SMN), iduronate-2-sulfatase (IDS), alpha-1-iduronidase (IDUA), tripeptidyl peptidase 1 (TPP1), low-density lipoprotein receptor (LDLR), myotubularin 1, acid alpha-glucosidase (GAA), dystrophia myotonica-protein kinase (DMPK), N-sulfoglucosamine sulfohydrolase (SGSH), fibroblast growth factor-4 (FGF-4), rab escort protein 1 (REP1), carbamoyl synthetase 1 (CPS1), argininosuccinate lyase (ASL), arginase, fumarylacetate hydrolase, alpha-1 antitrypsin, methyl malonyl CoA mutase, a cystic fibrosis transmembrane conductance regulator (CFTR) protein, and a dystrophin gene product (e.g., a minidystrophin or microdystrophin).

In certain embodiments, the nucleic acid (e.g., DNA, siRNA, or mRNA) is encapsulated in or complexed with a liposome, nanoparticle, lipid nanoparticle (LNP), polymer, microparticle, microcapsule, micelle, or extracellular vesicle.

In some embodiments, the nucleic acid (e.g., DNA, siRNA, or mRNA) is encapsulated in a lipid nanoparticle (LNP). Examples of LNPs capable of delivering a nucleic acid are described in International Patent Publication Nos. WO/2015/074085, WO/2016/081029, WO/2017/117530, WO/2018/118102, WO/2018/119163, WO/2018/222926, WO/2019/191780, WO/2020/016318, and WO/2020/154746.

In one embodiment, a lipid nanoparticle for use in the instant invention comprises (a) a nucleic acid (e.g., DNA, siRNA, or mRNA), (b) a cationic lipid, (c) an aggregation reducing agent (such as a PEG-lipid), (d) optionally a non-cationic lipid (such as a neutral lipid), and (e) optionally a sterol. In one embodiment, the lipid nanoparticle comprises (i) at least one cationic lipid; (ii) a neutral lipid, e.g., DSPC; (iii) a sterol, e.g., cholesterol; and (iv) a PEG-lipid, in a molar ratio of about 20-65% cationic lipid:5-25% neutral lipid:25-55% sterol; 0.5-15% PEG-lipid. In some embodiments, the cationic lipid is selected from ATX-002 ATX-081, ATX-095, or ATX-126 as described in WO/2018/222926.

In yet another aspect, the disclosure provides a method for treating a disorder in a subject, wherein said method comprises first administering a CD19 inhibitor to said subject and thereafter administering a therapeutically effective amount of a recombinant adeno-associated virus (rAAV) to said subject. As used herein, "disease," "disorder" and "condition" are used interchangeably, to indicate an abnormal state in a subject.

As will be appreciated by the skilled artisan equipped with the present disclosure, individuals suffering from one or more of a variety of disorders may benefit from a method of therapeutic recombinant AAV administration described herein. In some embodiments, the disorder may be selected from OTC deficiency, glycogen storage disease type 1a (GSD1a), hemophilia A, hemophilia B, Wilson disease, phenylketonuria, citrullinemia, CDKL5 deficiency (CDD), propionic acidemia, spinal muscular atrophy, mucopolysaccharidosis type I, mucopolysaccharidosis type II, CLN2 disease, homozygous familial hypercholesterolemia, Pompe disease, X-linked myotubular myopathy, myotonic dystrophy, Duchenne muscular dystrophy, cystic fibrosis, methylmalonic acidemia, Parkinson's disease, Alzheimer's disease, and Huntington's disease.

Any suitable method or route can be used to administer a rAAV or a rAAV-containing composition described herein. Routes of administration include, for example, systemic, oral, inhalation, intranasal, intratracheal, intraarterial, intraocular, intravenous, intrathecal, intracerebroventricular, intramuscular, subcutaneous, intradermal, and other parental routes of administration. In some embodiments, the rAAV, or a composition comprising a rAAV, is administered intravenously.

The specific dose administered can be a uniform dose for each subject, for example, $1.0 \times 10^{11}$-$1.0 \times 10^{14}$ genome copies (GC) of virus per subject. Alternatively, a subject's dose can be tailored to the approximate body weight or surface area of the subject. Other factors in determining the appropriate dosage can include the disease or condition to be treated or prevented, the severity of the disease, the route of administration, and the age, sex and medical condition of the subject. Further refinement of the calculations necessary to determine the appropriate dosage for treatment is routinely made by those skilled in the art, especially in light of the dosage information and assays disclosed herein. The dosage can also be determined through the use of known assays for determining dosages used in conjunction with appropriate dose-response data. An individual subject's dosage can also be adjusted as the progress of the disease is monitored.

In some embodiments, the rAAV is administered at a dose of, e.g., about $1.0 \times 10^{11}$ genome copies per kilogram of subject body weight (GC/kg) to about $1 \times 10^{14}$ GC/kg, about $5 \times 10^{11}$ genome copies per kilogram of subject body weight (GC/kg) to about $5 \times 10^{13}$ GC/kg, or about $1 \times 10^{12}$ to about $1 \times 10^{13}$ GC/kg, as measured by qPCR or digital droplet PCR (ddPCR). In some embodiments, the rAAV is administered at a dose of about $2 \times 10^{12}$ GC/kg. In some embodiments, the rAAV is administered at a dose of about $6 \times 10^{12}$ GC/kg. In some embodiments, the rAAV is administered at a dose of about $1 \times 10^{13}$ GC/kg.

In a further aspect, the present disclosure provides a method for administering at least two doses of recombinant adeno-associated virus (rAAV) to a subject, wherein said method comprises:

(a) administering a first dose of a CD19 inhibitor to said subject and thereafter administering a first rAAV to said subject, and (b) administering a second dose of a CD19 inhibitor to said subject and thereafter administering a second rAAV to said subject.

In some embodiments according to this second aspect, the CD19 inhibitor of the first and second doses is the same CD19 inhibitor. Alternatively, the CD19 inhibitor of the first dose may be a different CD19 inhibitor relative to the second dose.

In some embodiments according to this second aspect, the first rAAV and the second rAAV are the same rAAV. Alternatively, the first rAAV and the second rAAV are different.

In some embodiments according to this second aspect, the first rAAV and the second rAAV contain the same vector capsid. In an alternative embodiment, the first rAAV and the second rAAV contain different vector capsids.

In some embodiments according to this second aspect, the first rAAV and the second rAAV express the same transgene. In an alternative embodiment, the first rAAV and the second rAAV express different transgenes.

In some embodiments according to this second aspect, administration of the first dose of the CD19 inhibitor occurs more than 12 months prior to administration of the second dose of the CD19 inhibitor. In one embodiment, administration of the first dose of the CD19 inhibitor occurs more than 2 years prior to administration of the second dose of the CD19 inhibitor. In another embodiment, administration of the first dose of the CD19 inhibitor occurs more than 3, more than 4, more than 5, more than 6, more than 7, more than 8, more than 9, more than 10, more than 15, or more than 20 years prior to administration of the second dose of the CD19 inhibitor.

In some embodiments according to this second aspect, the CD19 inhibitor of the first dose is an anti-CD19 antibody. In some embodiments according to this second aspect, the CD19 inhibitor of the second dose is an anti-CD19 antibody. In some embodiments according to this second aspect, the CD19 inhibitor of the first and second doses is an anti-CD19 antibody. In one embodiment, the anti-CD19 antibody is selected from inebilizumab, tafasitamab, and FMC63. In an exemplary embodiment, the anti-CD19 antibody is inebilizumab.

In some embodiments according to this second aspect, the amount of CD19 inhibitor administered in the first and second doses is the same. Alternatively, the amount of CD19 inhibitor administered in the first dose may be different than the amount of the CD19 inhibitor administered in the second dose. In an exemplary embodiment, the amount of CD19 inhibitor administered in the first and second doses is the same. In another exemplary embodiment, the CD19 inhibitor is inebilizumab and the first dose is 300 mg and the second dose is 300 mg.

In some embodiments according to this second aspect, the regimen of dosing a CD19 inhibitor followed by administration of an rAAV may be repeated 3, 4, 5, or more times. Accordingly, in some embodiments according to this second aspect, the method may further comprise step (c) of administering a third dose of a CD19 inhibitor to said subject and thereafter administering a third rAAV to said subject.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular compound, that compound can be used in various embodiments of compositions of the present invention and/or in methods of the present invention, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" is before a quantitative value, the present invention also includes the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present invention remain operable. Moreover, two or more steps or actions may be conducted simultaneously.

The use of any and all examples, or exemplary language herein, for example, "such as" or "including" is intended merely to illustrate better the present invention and does not pose a limitation on the scope of the invention unless claimed. No language in the specification should be construed as indicating any non-claimed element as essential to the practice of the present invention.

```
                    SEQUENCE LISTING
(Heavy Chain Variable Region-VH)
                                       SEQ ID NO: 1
EVQLVESGGGLVQPGGSLRLSCAASGFTFSSSWMN

WVRQAPGKGLEWVGRIYPGDGDTNYNVKFKGRFTI

SRDDSKNSLYLQMNSLKTEDTAVYYCARSGFITTV

RDFDYWGQGTLVTVSS (Light Chain Variable Region-VL)
                                       SEQ ID NO: 2
EIVLTQSPDFQSVTPKEKVTITCRASESVDTFGIS

FMNWFQQKPDQSPKLLIHEASNQGSGVPSRFSGSG

SGTDFTLTINSLEAEDAATYYCQQSKEVPFTFGGG

TKVEIK (Heavy Chain Variable Region 1 CDR1)
                                       SEQ ID NO: 3
SSWMN (Heavy Chain Variable Region 1 CDR2)
                                       SEQ ID NO: 4
RIYPGDGDTNYNVKFKG (Heavy Chain Variable Region 1 CDR3)
                                       SEQ ID NO: 5
SGFITTVRDFDY
```

```
                       -continued
(Light Chain Variable Region 1 CDR1)
                                       SEQ ID NO: 6
RASESVDTFGISFMN (Light Chain Variable Region 1 CDR2)
                                       SEQ ID NO: 7
EASNQGS (Light Chain Variable Region 1 CDR3)
                                       SEQ ID NO: 8
QQSKEVPFT (Heavy Chain Variable Region-VH)
                                       SEQ ID NO: 9
EVQLVESGGGLVKPGGSLKLSCAASGYTFTSYVMH

WVRQAPGKGLEWIGYINPYNDGTKYNEKFQGRVTI

SSDKSISTAYMELSSLRSEDTAMYYCARGTYYYGT

RVFDYWGQGTLVTVSS (Light Chain Variable Region-VL)
                                       SEQ ID NO: 10
DIVMTQSPATLSLSPGERATLSCRSSKSLQNVNGN

TYLYWFQQKPGQSPQLLIYRMSNLNSGVPDRFSGS

GSGTEFTLTISSLEPEDFAVYYCMQHLEYPITFGA

GTKLEIK (Heavy Chain Variable Region CDR1)
                                       SEQ ID NO: 11
SYVMH (Heavy Chain Variable Region CDR2)
                                       SEQ ID NO: 12
NPYNDG (Heavy Chain Variable Region CDR3)
                                       SEQ ID NO: 13
GTYYYGTRVFDY (Light Chain Variable Region CDR1)
                                       SEQ ID NO: 14
RSSKSLQNVNGNTYLY (Light Chain Variable Region CDR2)
                                       SEQ ID NO: 15
RMSNLNS (Light Chain Variable Region CDR3)
                                       SEQ ID NO: 16
MQHLEYPIT (AAV2 ITR)
                                       SEQ ID NO: 17
TTGGCCACTCCCTCTCTGCGCGCTCGCTCGCTCACT

GAGGCCGGGCGACCAAAGGTCGCCCGACGCCCGGG

CTTTGCCCGGGCGGCCTCAGTGAGCGAGCGAGCGC

GCAGAGAGGGAGTGGCCAACTCCATCACTAGGGGT

TCCT (AAV9 Nucleic Acid Sequence)
                                       SEQ ID NO: 18
ATGGCTGCCGATGGTTATCTTCCAGATTGGCTCGA

GGACAACCTTAGTGAAGGAATTCGCGAGTGGTGGG

CTTTGAAACCTGGAGCCCCTCAACCCAAGGCAAAT

CAACAACATCAAGACAACGCTCGAGGTCTTGTGCT

TCCGGGTTACAAATACCTTGGACCCGGCAACGGAC

TCGACAAGGGGGAGCCGGTCAACGCAGCAGACGCG
```

```
GCGGCCCTCGAGCACGACAAGGCCTACGACCAGCA
GCTCAAGGCCGGAGACAACCCGTACCTCAAGTACA
ACCACGCCGACGCCGAGTTCCAGGAGCGGCTCAAA
GAAGATACGTCTTTTGGGGGCAACCTCGGGCGAGC
AGTCTTCCAGGCCAAAAAGAGGCTTCTTGAACCTC
TTGGTCTGGTTGAGGAAGCGGCTAAGACGGCTCCT
GGAAAGAAGAGGCCTGTAGAGCAGTCTCCTCAGGA
ACCGGACTCCTCCGCGGGTATTGGCAAATCGGGTG
CACAGCCCGCTAAAAAGAGACTCAATTTCGGTCAG
ACTGGCGACACAGAGTCAGTCCCAGACCCTCAACC
AATCGGAGAACCTCCCGCAGCCCCCTCAGGTGTGG
GATCTCTTACAATGGCTTCAGGTGGTGGCGCACCA
GTGGCAGACAATAACGAAGGTGCCGATGGAGTGGG
TAGTTCCTCGGGAAATTGGCATTGCGATTCCCAAT
GGCTGGGGACAGAGTCATCACCACCAGCACCCGA
ACCTGGGCCCTGCCCACCTACAACAATCACCTCTA
CAAGCAAATCTCCAACAGCACATCTGGAGGATCTT
CAAATGACAACGCCTACTTCGGCTACAGCACCCCC
TGGGGGTATTTTGACTTCAACAGATTCCACTGCCA
CTTCTCACCACGTGACTGGCAGCGACTCATCAACA
ACAACTGGGGATTCCGGCCTAAGCGACTCAACTTC
AAGCTCTTCAACATTCAGGTCAAAGAGGTTACGGA
CAACAATGGAGTCAAGACCATCGCCAATAACCTTA
CCAGCACGGTCCAGGTCTTCACGGACTCAGACTAT
CAGCTCCCGTACGTGCTCGGGTCGGCTCACGAGGG
CTGCCTCCCGCCGTTCCCAGCGGACGTTTTCATGA
TTCCTCAGTACGGGTATCTGACGCTTAATGATGGA
AGCCAGGCCGTGGGTCGTTCGTCCTTTTACTGCCT
GGAATATTTCCCGTCGCAAATGCTAAGAACGGGTA
ACAACTTCCAGTTCAGCTACGAGTTTGAGAACGTA
CCTTTCCATAGCAGCTACGCTCACAGCCAAAGCCT
GGACCGACTAATGAATCCACTCATCGACCAATACT
TGTACTATCTCTCAAAGACTATTAACGGTTCTGGA
CAGAATCAACAAACGCTAAAATTCAGTGTGGCCGG
ACCCAGCAACATGGCTGTCCAGGGAAGAAACTACA
TACCTGGACCCAGCTACCGACAACAACGTGTCTCA
ACCACTGTGACTCAAAACAACAACAGCGAATTTGC
TTGGCCTGGAGCTTCTTCTTGGGCTCTCAATGGAC
GTAATAGCTTGATGAATCCTGGACCTGCTATGGCC
AGCCACAAAGAAGGAGAGGACCGTTTCTTTCCTTT
GTCTGGATCTTTAATTTTTGGCAAACAAGGAACTG
GAAGAGACAACGTGGATGCGGACAAAGTCATGATA
ACCAACGAAGAAGAAATTAAAACTACTAACCCGGT
AGCAACGGAGTCCTATGGACAAGTGGCCACAAACC
ACCAGAGTGCCCAAGCACAGGCGCAGACCGGCTGG
GTTCAAAACCAAGGAATACTTCCGGGTATGGTTTG
GCAGGACAGAGATGTGTACCTGCAAGGACCCATTT
GGGCCAAAATTCCTCACACGGACGGCAACTTTCAC
CCTTCTCCGCTGATGGGAGGGTTTGGAATGAAGCA
CCCGCCTCCTCAGATCCTCATCAAAAACACACCTG
TACCTGCGGATCCTCCAACGGCCTTCAACAAGGAC
AAGCTGAACTCTTTCATCACCCAGTATTCTACTGG
CCAAGTCAGCGTGGAGATCGAGTGGGAGCTGCAGA
AGGAAAACAGCAAGCGCTGGAACCCGGAGATCCAG
TACACTTCCAACTATTACAAGTCTAATAATGTTGA
ATTTGCTGTTAATACTGAAGGTGTATATAGTGAAC
CCCGCCCCATTGGCACCAGATACCTGACTCGTAAT
CTGTAA
(AAV9 Amino Acid Sequence)
                    SEQ ID NO: 19
MAADGYLPDWLEDNLSEGIREWWALKPGAPQPKAN
QQHQDNARGLVLPGYKYLGPGNGLDKGEPVNAADA
AALEHDKAYDQQLKAGDNPYLKYNHADAEFQERLK
EDTSFGGNLGRAVFQAKKRLLEPLGLVEEAAKTAP
GKKRPVEQSPQEPDSSAGIGKSGAQPAKKRLNFGQ
TGDTESVPDPQPIGEPPAAPSGVGSLTMASGGGAP
VADNNEGADGVGSSSGNWHCDSQWLGDRVITTSTR
TWALPTYNNHLYKQISNSTSGGSSNDNAYFGYSTP
WGYFDFNRFHCHFSPRDWQRLINNNWGFRPKRLNF
KLFNIQVKEVTDNNGVKTIANNLTSTVQVFTDSDY
QLPYVLGSAHEGCLPPFPADVFMIPQYGYLTLNDG
SQAVGRSSFYCLEYFPSQMLRTGNNFQFSYEFENV
PFHSSYAHSQSLDRLMNPLIDQYLYYLSKTINGSG
QNQQTLKFSVAGPSNMAVQGRNYIPGPSYRQQRVS
TTVTQNNNSEFAWPGASSWALNGRNSLMNPGPAMA
SHKEGEDREFPLSGSLIFGKQGTGRDNVDADKVMI
TNEEEIKTTNPVATESYGQVATNHQSAQAQAQTGW
VQNQGILPGMVWQDRDVYLQGPIWAKIPHTDGNFH
PSPLMGGFGMKHPPPQILIKNTPVPADPPTAFNKD
KLNSFITQYSTGQVSVEIEWELQKENSKRWNPEIQ
YTSNYYKSNNVEFAVNTEGVYSEPRPIGTRYLTRN
L
```

(Streptococcus pyogenes IdeS)

SEQ ID NO: 20

DSFSANQEIRYSEVTPYHVTSVWTKGVTPPANFTQ

GEDVFHAPYVANQGWYDITKTFNGKDDLLCGAATA

GNMLHWWFDQNKDQIKRYLEEHPEKQKINFNGEQM

FDVKEAIDTKNHQLDSKLFEYFKEKAFPYLSTKHL

GVFPDHVIDMFINGYRLSLTNHGPTPVKEGSKDPR

GGIFDAVFTRGDQSKLLTSRHDFKEKNLKEISDLI

KKELTEGKALGLSHTYANVRINHVINLWGADFDSN

GNLKAIYVTDSDSNASIGMKKYFVGVNSAGKVAIS

AKEIKEDNIGAQVLGLFTLSTGQDSWNQTN (Streptococcus equi IdeZ)

SEQ ID NO: 21

MKTIAYPNKPHSLSAGLLTAIAIFSLASSNITYAD

DYQRNATEAYAKEVPHQITSVWSKGVTPLTPEQFR

YNNEDVIHAPYLAHQGWYDITKAFDGKDNLLCGAA

TAGNMLHWWFDQNKTEIEAYLSKHPEKQKIIFNNQ

ELFDLKAAIDTKDSQTNSQLFNYFRDKAFPNLSAR

QLGVMPDLVLDMFINGYYLNVFKTQSTDVNRPYQD

KDKRGGIFDAVFTRGDQTTLLTARHDLKNKGLNDI

STIIKQELTEGRALALSHTYANVSISHVINLWGAD

FNAEGNLEAIYVTDSDANASIGMKKYFVGINAHGH

VAISAKKIEGENIGAQVLGLFTLSSGKDIWQKLS

What is claimed is:

1. A method of managing an immune response against a recombinant adeno-associated virus (rAAV) administered to a subject, the method comprising: (a) administering a CD19 inhibitor to said subject and (b) subsequently administering the rAAV to said subject.

2. The method of claim 1, wherein the CD19 inhibitor is administered to the subject at least about 24 hours before administration of the rAAV.

3. The method of claim 1, wherein the CD19 inhibitor is administered once before administration of the rAAV.

4. The method of claim 1, wherein the CD19 inhibitor is administered twice before administration of the rAAV.

5. The method of claim 1, wherein the CD19 inhibitor is an anti-CD19 antibody.

6. The method of claim 5, wherein the anti-CD19 antibody is selected from inebilizumab, tafasitamab, and FMC63.

7. The method of claim 6, wherein the anti-CD19 antibody is inebilizumab.

8. The method of claim 5, wherein the anti-CD19 antibody is administered at a dose of about 10 mg to about 3000 mg.

9. The method of claim 5, wherein the anti-CD19 antibody is administered at a dose of about 1 mg/kg to about 10 mg/kg.

10. The method of claim 1, wherein the method further comprises administering intravenous immune globulin (IVIg) before, simultaneous with, or after administration of the CD19 inhibitor.

11. The method of claim 1, wherein the method further comprises administering a corticosteroid before, simultaneous with, or after administration of the CD19 inhibitor.

12. The method of claim 1, wherein the method further comprises administering an agent selected from a proteasome inhibitor, a TLR antagonist, an immunosuppressive macrocycle, an antimetabolite, a cGAS-STING antagonist, IL-2, an IL-2 mutein, an anti-CD38 antibody, an immunomodulatory drug (IMiD), an anti-B-cell maturation antigen (BCMA) agent, an anti-SLAM family member 7 (SLAMF7) antibody, a mammalian target of rapamycin (mTOR) inhibitor, SEL-212, cyclophosphamide, mycophenolate mofetil, a phosphoinositide 3-kinase inhibitor, a Bruton's tyrosine kinase inhibitor, a sphingosine-1-phosphate receptor modulator, an anti-B-cell activating factor inhibitor, and an IgG-degrading protease, wherein the agent is administered before, simultaneous with, or after administration of the CD19 inhibitor.

13. The method of claim 1, wherein the rAAV comprises an AAV capsid and a vector genome packaged therein.

14. The method of claim 13, wherein the AAV capsid is selected from an AAV of serotype 1, 2, 3, 4, 5, 6, 7, 8, 9, 10, 11, 12, rh10, hu37, and an engineered variant of any one thereof.

15. The method of claim 13, wherein the vector genome comprises a coding sequence for a protein.

16. The method of claim 15, wherein the coding sequence is a native coding sequence.

17. The method of claim 15, wherein the coding sequence is a codon-optimized coding sequence.

18. The method of claim 15, wherein the coding sequence expresses a protein transgene selected from ornithine transcarbamylase (OTC), glucose 6-phosphatase (G6Pase), factor VIII, factor IX, ATP7B, phenylalanine hydroxylase (PAH), argininosuccinate synthetase, cyclin-dependent kinase-like 5 (CDKL5), propionyl-CoA carboxylase subunit a (PCCA), propionyl-CoA carboxylase subunit b (PCCB), survival motor neuron (SMN), iduronate-2-sulfatase (IDS), alpha-1-iduronidase (IDUA), tripeptidyl peptidase 1 (TPP1), low-density lipoprotein receptor (LDLR), myotubularin 1, acid alpha-glucosidase (GAA), dystrophia myotonica-protein kinase (DMPK), N-sulfoglucosamine sulfohydrolase (SGSH), fibroblast growth factor-4 (FGF-4), rab escort protein 1 (REP1), carbamoyl synthetase 1 (CPS1), argininosuccinate lyase (ASL), arginase, fumarylacetate hydrolase, alpha-1 antitrypsin, methyl malonyl CoA mutase, a cystic fibrosis transmembrane conductance regulator (CFTR) protein, and a dystrophin gene product.

19. The method of claim 1, wherein the rAAV is administered subcutaneously, intramuscularly, intradermally, intraperitoneally, intrathecally, intracerebroventricularly, or intravenously.

20. The method of claim 1, wherein the rAAV is administered at a dose of about $1\times10^{11}$ to about $1\times10^{14}$ genome copies (GC)/kg.

* * * * *